US012739803B2

(12) United States Patent
Grant et al.

(10) Patent No.: US 12,739,803 B2
(45) Date of Patent: Sep. 15, 2026

(54) MULTI-SLOT PHYSICAL LAYER DOWNLINK CONTROL CHANNEL (PDCCH) MONITORING

(71) Applicant: TELEFONAKTIEBOLAGET LM ERICSSON (PUBL), Stockholm (SE)

(72) Inventors: Stephen Grant, Pleasanton, CA (US); Jung-Fu Cheng, Fremont, CA (US); Havish Koorapaty, Saratoga, CA (US)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 232 days.

(21) Appl. No.: 18/701,527

(22) PCT Filed: Oct. 17, 2022

(86) PCT No.: PCT/IB2022/059958

§ 371 (c)(1),
(2) Date: Apr. 15, 2024

(87) PCT Pub. No.: WO2023/062610

PCT Pub. Date: Apr. 20, 2023

(65) Prior Publication Data

US 2024/0430899 A1 Dec. 26, 2024

Related U.S. Application Data

(60) Provisional application No. 63/256,497, filed on Oct. 15, 2021.

(51) Int. Cl.

*H04L 5/00* (2006.01)
*H04W 72/0446* (2023.01)

(Continued)

(52) U.S. Cl.

CPC ....... *H04W 72/0446* (2013.01); *H04L 5/0053* (2013.01); *H04L 5/0091* (2013.01);

(Continued)

(58) Field of Classification Search

CPC ...... H04L 5/0001–0098; H04W 36/0005–385; H04W 48/02–20;

(Continued)

(56) References Cited

U.S. PATENT DOCUMENTS

2020/0196306 A1 6/2020 Si et al.
2024/0396694 A1* 11/2024 Kuang .................. H04L 5/0053
2025/0016746 A1* 1/2025 Grant ................ H04W 72/0446

OTHER PUBLICATIONS

CATT, “PDCCH monitoring enhancements for up to 71 GHz operation”, 3GPP TSG RAN WG1 #106b-e, R1-2109209, e-Meeting, Oct. 11-19, 2021. (Year: 2021).*

(Continued)

*Primary Examiner* — Timothy J Weidner

(57) ABSTRACT

A user equipment (UE) performs multi-slot physical downlink control channel (PDCCH) monitoring. The UE receives a search space configuration from a network node. The UE determines a search space monitoring slot within a first X-slot group of a fixed pattern of X-slot groups based on a location of the first slot of type0 Common Search Space (CSS) monitoring occasions. The UE determines which one or more slot indices to monitor. The UE determines which one or more symbols to monitor within the determined one or more slot indices. The UE monitors the determined symbols within the determined slot indices for PDCCH.

20 Claims, 13 Drawing Sheets

(51) Int. Cl.
*H04W 72/23* (2023.01)
*H04W 84/02* (2009.01)
*H04W 88/02* (2009.01)
*H04W 88/08* (2009.01)
*H04W 92/02* (2009.01)
*H04W 92/10* (2009.01)

(52) U.S. Cl.
CPC ............ *H04W 72/23* (2023.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ......... H04W 72/02–569; H04W 74/002–0891; H04W 84/02–16; H04W 88/02–12; H04W 92/02–04; H04W 92/10
See application file for complete search history.

(56) References Cited

OTHER PUBLICATIONS

Intel Corporation, "Discussion on PDCCH monitoring enhancements for extending NR up to 71 GHz", 3GPP TSG RAN WG1 Meeting #106-bis-e, R1-2109599, e-Meeting, Oct. 11-19, 2021. (Year: 2021).*
3GPP, "3rd Generation Partnership Project; Technical Specification Group Radio Access Network; NR; Physical layer procedures for control (Release 16)", Sep. 2021, pp. 1-188, 3GPP TS 38.213 V16.7.0, France.
CATT, "PDCCH monitoring enhancements for up to 71 GHz operation", 3GPP TSG RAN WG1 #106b-e, R1-2109209, e-Meeting, Oct. 11-19, 2021.
Intel Corporation, "Discussion on PDCCH monitoring enhancements for extending NR up to 71 GHz", 3GPP TSG RAN WG1 Meeting #106-bis-e, R1-2109599, e-Meeting, Oct. 11-19, 2021.
Lenovo (Moderator), "Feature lead summary for B52.6 GHz PDCCH monitoring enhancements", 3GPP TSG RAN WG1#104-e, R2-2103689, e-Meeting, Apr. 12-20, 2021.

* cited by examiner

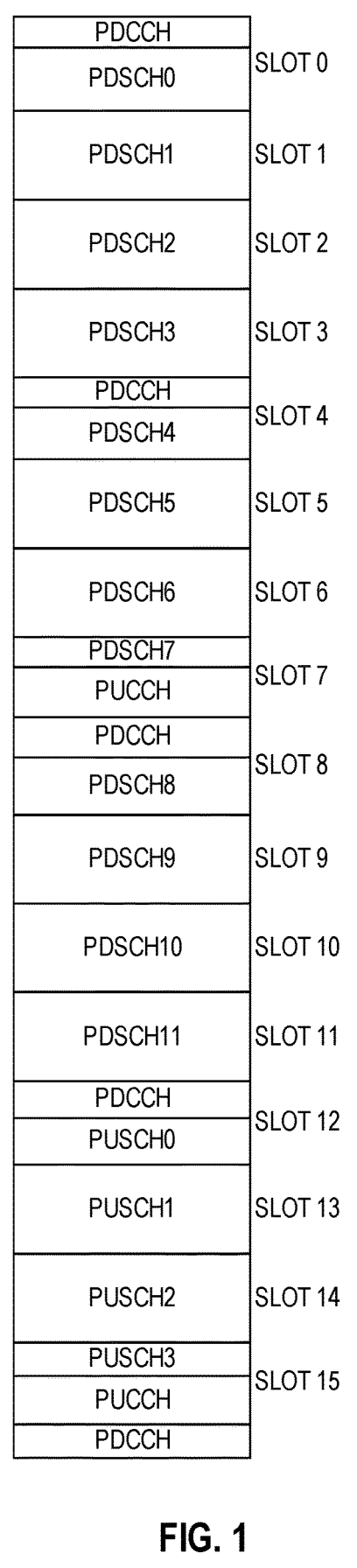

| Channel | Slot |
|---|---|
| PDCCH | SLOT 0 |
| PDSCH0 | |
| PDSCH1 | SLOT 1 |
| PDSCH2 | SLOT 2 |
| PDSCH3 | SLOT 3 |
| PDCCH | SLOT 4 |
| PDSCH4 | |
| PDSCH5 | SLOT 5 |
| PDSCH6 | SLOT 6 |
| PDSCH7 | SLOT 7 |
| PUCCH | |
| PDCCH | SLOT 8 |
| PDSCH8 | |
| PDSCH9 | SLOT 9 |
| PDSCH10 | SLOT 10 |
| PDSCH11 | SLOT 11 |
| PDCCH | SLOT 12 |
| PUSCH0 | |
| PUSCH1 | SLOT 13 |
| PUSCH2 | SLOT 14 |
| PUSCH3 | SLOT 15 |
| PUCCH | |
| PDCCH | |

FIG. 1

MULTI-SLOT PHYSICAL LAYER DOWNLINK CONTROL CHANNEL (PDCCH) MONITORING

CROSS-REFERENCE TO RELATED APPLICATIONS

This application is a national phase application of International Patent Application No. PCT/IB2022/059958, filed Oct. 17, 2021, which claims the benefit of U.S. Provisional Application No. 63/256,497, filed Oct. 15, 2021, which are hereby incorporated by reference in their entirety.

TECHNICAL FIELD

Embodiments of the invention relate to the field of wireless communication; and more specifically, to multi-slot physical layer downlink control channel (PDCCH) monitoring.

BACKGROUND ART

Mobile broadband will continue to drive the demands for big overall traffic capacity and huge achievable end-user data rates in the wireless access network. Several scenarios in the future will require data rates of up to 10 Gbps in local areas. These demands for very high system capacity and very high end-user date rates can be met by networks with distances between access nodes ranging from a few meters in indoor deployments up to roughly 50 m in outdoor deployments, i.e., with an infra-structure density considerably higher than the densest networks of today.

In 3GPP Rel-15, a 5G system referred as New Radio (NR) was specified. The current NR system specifications are detailed in 3GPP TS 38.213 v. 16.7.0 (September 2021) and 3GPP TS 38.331 v. 16.6.0 (September 2021). NR standard in 3GPP is designed to provide services for multiple use cases such as enhanced mobile broadband (eMBB), ultra-reliable and low latency communication (URLLC), and machine type communication (MTC). Each of these services has different technical requirements. For example, the general requirement for eMBB is high data rate with moderate latency and moderate coverage, while URLLC service requires a low latency and high reliability transmission but perhaps for moderate data rates.

Besides traditional licensed exclusive bands, NR systems are currently being extended expected to operate on unlicensed bands. The NR system specifications currently address two frequency ranges (FR1 and FR2). For FR1 the corresponding frequency range is between 410 MHz and 7125 MHz. For FR2, the corresponding frequency range is between 24250 MHz and 52600 MHz. To support ever growing mobile traffic, further extension of the NR system to support spectrum higher than 5.26 GHz is expected in the near future.

Overview of Rel-15 NR System

Numerology and Bandwidth Consideration for NR

The downlink transmission waveform in NR is conventional Orthogonal frequency division multiplex (OFDM) using a cyclic prefix. The uplink transmission waveform is conventional OFDM using a cyclic prefix with a transform precoding function performing Discrete Fourier Transform (DFT) spreading that can be disabled or enabled. The basic transmitter block diagram for NR for CP-OFDM with optional DFT-spreading includes a transform precoding block (optionally present in Uplink (UL), not present in Downlink (DL)), a sub-carrier mapping block, an IFFT block, and a Cyclic prefix (CP) insertion block.

Multiple numerologies are supported in NR. A numerology is defined by sub-carrier spacing and CP overhead. Multiple subcarrier spacings (SCS) can be derived by scaling a basic subcarrier spacing by an integer $2^{\mu}$. The numerology used can be selected independently of the frequency band although it is assumed not to use a very small subcarrier spacing at very high carrier frequencies. Flexible network and UE channel bandwidths are supported. The supported transmission numerologies in NR are summarized in Table 1.

TABLE 1

Transmission numerologies supported in NR.

| $\mu$ | $\Delta f = 2^{\mu} \cdot 15$ [kHz] | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

From RAN1 specification perspective, maximum channel bandwidth per NR carrier is 400 MHz in Rel-15. At least for single numerology case, candidates of the maximum number of subcarriers per NR carrier is 3300 in Rel-15 from RAN1 specification perspective.

Downlink and uplink transmissions are organized into frames with 10 ms duration, consisting of ten 1 ms subframes. Each frame is divided into two equally sized half-frames of five subframes each. The slot duration is 14 symbols with Normal CP and 12 symbols with Extended CP, and scales in time as a function of the used sub-carrier spacing so that there is always an integer number of slots in a subframe. More specifically, the number of slots per subframe is $2^{\mu}$.

The basic NR downlink physical resource within a slot can thus be seen as a time-frequency grid for 15 kHz sub-carrier spacing numerology, where each resource element corresponds to one OFDM subcarrier during one OFDM symbol interval. A resource block is defined as 12 consecutive subcarriers in the frequency domain. The uplink subframe has the same subcarrier spacing as the downlink and the same number of SC-FDMA symbols in the time domain as OFDM symbols in the downlink.

PDCCH Monitoring in NR

In 3GPP NR standard, downlink control information (DCI) is received over the physical layer downlink control channel (PDCCH). The PDCCH may carry DCI in messages with different formats. DCI format 0_0 and 0_1 are DCI messages used to convey uplink grants to the UE for transmission of the physical layer data channel in the uplink (PUSCH) and DCI format 1_0 and 1_1 are used to convey downlink grants for transmission of the physical layer data channel on the downlink (PDSCH). Other DCI formats (2_0, 2_1, 2_2 and 2_3) are used for other purposes such as transmission of slot format information, reserved resource, transmit power control information etc.

A PDCCH candidate is searched within a common or UE-specific search space which is mapped to a set of time and frequency resources referred to as a control resource set (CORESET) instance. The search spaces within which PDCCH candidates must be monitored are configured to the UE via radio resource control (RRC) signaling. A monitoring periodicity is also configured for different search space sets. A CORESET is defined by the frequency domain location and size as well as the time domain size. A CORESET in NR can be 1, 2 or 3 OFDM symbols in duration. The smallest unit used for defining CORESETs is a Resource Element Group (REG) which is defined as spanning 12 subcarriers×1 OFDM symbol in frequency and time. Resource-element groups within a control-resource set are numbered in increasing order in a time-first manner, starting with 0 for the first OFDM symbol and the lowest-numbered resource block in the control resource set. As a result, though different PDCCHs can occupy different amount of frequency domain resources, all PDCCHs in a CORESET have the same duration as the duration of the CORESET.

Each REG contains demodulation reference signals (DM-RS) to aid in the estimation of the radio channel over which that REG was transmitted. When transmitting the PDCCH, a precoder could be used to apply weights at the transmit antennas based on some knowledge of the radio channel prior to transmission. It is possible to improve channel estimation performance at the UE by estimating the channel over multiple REGs that are proximate in time and frequency if the precoder used at the transmitter for the REGs is not different. To assist the UE with channel estimation the multiple REGs can be grouped together to form a REG bundle and the REG bundle size for a CORESET is indicated to the UE. The UE may assume that any precoder used for the transmission of the PDCCH is the same for all the REGs in the REG bundle. A REG bundle may consist of 2, 3 or 6 REGs.

A control channel element (CCE) consists of 6 REGs. The REGs within a CCE may either be contiguous or distributed in frequency. When the REGs are distributed in frequency, the CORESET is said to be using an interleaved mapping of REGs to a CCE and if the REGs are not distributed in frequency, a non-interleaved mapping is said to be used.

PDCCHs targeting different coverage ranges are designed based assigning different amount of frequency domain resources to the PDCCHs. A PDCCH candidate may span 1, 2, 4, 8 or 16 CCEs and the number of aggregated CCEs used is referred to as the aggregation level for the PDCCH candidate.

Search Space Sets

A set of PDCCH candidates for a UE to monitor is defined in terms of PDCCH search space sets. A search space set can be a common search space (CSS) set or a UE-specific search space (USS) set. A UE monitors PDCCH candidates in one or more of the following search spaces sets

- a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG
- a Type0A-PDCCH CSS set configured by searchSpaceOtherSystemInformation in PDCCH-ConfigCommon for a DCI format with CRC scrambled by a SI-RNTI on the primary cell of the MCG
- a Type1-PDCCH CSS set configured by ra-SearchSpace in PDCCH-ConfigCommon for a DCI format with CRC scrambled by a RA-RNTI, a MsgB-RNTI, or a TC-RNTI on the primary cell
- a Type2-PDCCH CSS set configured by pagingSearchSpace in PDCCH-ConfigCommon for a DCI format with CRC scrambled by a P-RNTI on the primary cell of the MCG
- a Type3-PDCCH CSS set configured by SearchSpace in PDCCH-Config with searchSpaceType=common for DCI formats with CRC scrambled by INT-RNTI, SFI-RNTI, TPC-PUSCH-RNTI, TPC-PUCCH-RNTI, TPC-SRS-RNTI, or CI-RNTI and, only for the primary cell, C-RNTI, MCS-C-RNTI, CS-RNTI(s), or PS-RNTI and
- a USS set configured by SearchSpace in PDCCH-Config with searchSpaceType=ue-Specific for DCI formats with CRC scrambled by C-RNTI, MCS-C-RNTI, SP-CSI-RNTI, CS-RNTI(s), SL-RNTI, SL-CS-RNTI, or SL Semi-Persistent Scheduling V-RNTI.

Type0-PDCCH and System Information Block Type1 (SIB1)

SIB1 is scheduled on PDSCH by PDCCH scrambled with SI-RNTI in the Type0-PDCCH common search space set. If during cell search a UE determines from MIB that a CORESET for Type0-PDCCH CSS set is present, as described in Subclause 4.1 of 38.213, the UE determines a number of consecutive resource blocks and a number of consecutive symbols for the CORESET of the Type0-PDCCH CSS set from controlResourceSetZero (simply an index to a row in a first table) in pdcch-ConfigSIB1, as described in Tables 13-1 through 13-10 in 38.213. These tables provide the configuration (duration, bandwidth, and PRB location of CORESET0). The UE determines the configuration of the PDCCH monitoring occasions from searchSpaceZero (simply and index to a row in a second table) in pdcch-ConfigSIB1, included in MIB, as described in Tables 13-11 through 13-15 in 38.213.

For synchronization signal (SS)/physical broadcast channel (PDCH) block and CORESET multiplexing pattern 1, the UE monitors two consecutive slots starting from the one indicated by the procedure in 38.213 § 13 denoted by slot $n_0$ and slot $n_0+1$.

The UE determines which table (Tables 13-1 through 13-10) to use based on a combination of the sub-carrier spacing for the detected SS/PBCH block (as defined in 38.101-1 per band), the sub-carrier spacing of PDCCH (as indicated by subCarrierSpacingCommon in MIB), the frequency range FR1/FR2, and the minimum channel bandwidth (as defined by 38.101-1 per band).

There are a number of exceptions where 38.101-1/2 defines two different sub-carrier spacings for the SS/PBCH block for a band. For those cases the UE needs to try both sub-carrier spacings when detecting the SS/PBCH block.

Search Space Configuration

In Rel-15/16, the RRC parameter monitoringSlotPeriodicityAndOffset is used to configure the periodicity and offset of the search space.

The parameter duration indicates the number of consecutive slots for PDCCH monitoring occasions within the search space set configuration periodicity. If the field is absent, the UE applies the value 1 slot, except for DCI format 2_0. The UE ignores this field for DCI format 2_0.

The first symbol(s) for PDCCH monitoring in the slots configured for PDCCH monitoring is determined by the bitmap in monitoringSymbolsWithinSlot. The most significant (left) bit represents the first OFDM in a slot, and the second most significant (left) bit represents the second OFDM symbol in a slot and so on. The bit(s) set to one identify the first OFDM symbol(s) of the control resource set within a slot. The following is an example of a list of configurable fields of a search space configuration.

```
SearchSpace ::=                       SEQUENCE {
  searchSpaceId                         SearchSpaceId,
  controlResourceSetId                  ControlResourceSetId
  monitoringSlotPeriodicityAndOffset    CHOICE {
    sl1                                   NULL,
    sl2                                   INTEGER (0..1),
    sl4                                   INTEGER (0..3),
    sl5                                   INTEGER (0..4),
    sl8                                   INTEGER (0..7),
    sl10                                  INTEGER (0..9),
    sl16                                  INTEGER (0..15),
    sl20                                  INTEGER (0..19),
    sl40                                  INTEGER (0..39),
    sl80                                  INTEGER (0..79),
    sl160                                 INTEGER (0..159),
    sl320                                 INTEGER (0..319),
    sl640                                 INTEGER (0..639),
    sl1280                                INTEGER (0..1279),
    sl2560                                INTEGER (0..2559)
  }
  duration                              INTEGER (2..2559)
  monitoringSymbolsWithinSlot           BIT STRING (SIZE (14))
```

PDCCH Processing Capability Requirements and Limitations for High Frequency Systems Blind decoding of potential PDCCH transmissions is attempted by the UE in each of the configured PDCCH candidates within a slot. In any particular slot, the UE may be configured to monitor multiple PDCCH candidates in multiple search spaces which may be mapped to one or more CORESETs. PDCCH candidates may need to be monitored multiple times in a slot, once every slot or once in multiple of slots. The maximum number of PDCCH candidates that can be monitored by a UE for a carrier within a slot are summarized in Table 2Table. The complexity incurred at the UE to do this depends on the number of CCEs which need to be processed to test all the candidates in the CORESET. Channel estimation is a key contributor to the complexity incurred by the UE. The maximum number of CCEs of channel estimation supported by the UE for a carrier within a slot are summarized in Table 2.

TABLE 2

Maximum number of PDCCH candidates and maximum number of CCE for channel estimation within a slot for a carrier.

| SCS | 15 kHz | 30 kHz | 60 kHz | 120 kHz |
|---|---|---|---|---|
| Max # of candidates | 44 | 36 | 22 | 20 |
| Max # of CCE estimation | 56 | 56 | 48 | 32 |

The Rel-15 PDCCH processing capabilities per slot can be fitted to simple formulae to obtain initial benchmarks for further discussion. Using the minimum mean absolute deviation fitting, the fitted formulae are given by $$N_{BD,\mu}^{slot} \cong 44 \times 2^{-0.38\mu}$$

$$N_{CCE,\mu}^{slot} \cong 62.6 \times 2^{-0.32\mu}$$

The fitted and extrapolated PDCCH processing capabilities per slot are shown in Table where the values for 240 kHz SCS and above are extrapolated values for sub-carrier spacings larger than 120 kHz. Since $$N_{CCE,\mu}^{slot} \text{ for } \mu = 0 \text{ and } \mu = 1$$

are identical, the fitting takes a nominal μ=0.5 to pair with $$N_{CCE,\mu}^{slot} = 56$$

as input. It can be observed that UE processing capabilities may become extremely limited when using large sub-carrier spacing and very short frame structures for high-frequency bands. There are then doubts on whether the UE operating with ≥1920 kHz SCS can support even one AL-16 PDCCH or the default number of candidates for monitoring the seven PDCCH candidates in Type0A-PDCCH CSS as specified in NR specs.

TABLE 3

Extrapolated $N_{BD}^{slot}$ and $N_{CCE}^{slot}$ values per slot.

| μ | 0 | 1 | 2 | 3 | 4 | 5 | 6 | 7 | 8 |
|---|---|---|---|---|---|---|---|---|---|
| SCS [KHz] | 15 | 30 | 60 | 120 | 240 | 480 | 960 | 1920 | 3840 |
| $N_{BD,\mu}^{slot}$ | 44 | 36 | 22 | 20 | | | | | |
| Estimate | 44 | 34 | 26 | 20 | 15 | 12 | 9 | 7 | 5 |
| μ | 0 | 1 | 2 | 3 | 4 | 5 | 6 | 7 | 8 |
| SCS [KHz] | $15*2^{0.5}$ | | 60 | 120 | 240 | 480 | 960 | 1920 | 3840 |
| $N_{CCE,\mu}^{slot}$ | 56 | | 48 | 32 | | | | | |
| Estimate | 56 | | 40 | 32 | 26 | 20 | 16 | 13 | 10 |

One possible direction is to reduce the periodicity of PDCCH monitoring at a UE to allow more time for the UE to process the PDCCH candidates. For instance, FIG. 1 illustrates a case where the UE is configured to monitor PDCCH candidates every slot bundle with bundling size X=4 slots.

Beam-Forming Centric Transmission for NR Operation in mm-Wave Frequency

As the operating frequency of wireless networks increases and moves to milli-meter wave territory, data transmission between nodes suffers from high propagation loss, which is proportional to the square of the carrier frequency. Moreover, milli-meter wave signal also suffers from high oxygen absorption, high penetration loss and a variety of blockage problems. On the other hand, with the wavelength as small as less than a centi-meter, it becomes possible to pack a large amount (tens, hundreds or even thousands) of antenna elements into a single antenna array with a compact form factor, which can be widely adopted in a network equipment and a user device. Such antenna arrays/panels can generate narrow beams with high beam forming gain to compensate for the high path loss in mm-wave communications, as well as providing highly directional transmission and reception pattern. As a consequence, directional transmission and reception are the distinguishing characteristics for wireless networks in mm-wave bands. In the case of analog beamforming where the amplitude/phase of each antenna element is adjusted as RF, a transmitter/receiver can typically only transmit/receive in one direction at a time, or if the UE is equipped with two or more panels, a few directions at any given time. This is in contrast to digital or hybrid analog-digital beamforming, where the phase weights are applied at baseband allowing different beam directions in different frequency sub-bands.

PDCCH TCI States

To support beam-based operation in NR, a UE can be configured with a number of transmission configuration indicator (TCI) states. A TCI state (see below extract from 38.331) provides the UE with the ID of one or two reference signals, where each reference signal can be an SS/PBCH block or a channel state information reference signal (CSI-RS). A quasi-co-location (QCL) type is associated with each of the reference signals of the TCI state, and the type can take one of 4 possible values: TypeA, TypeB, TypeC, or TypeD. A particular TCI state is indicated to the UE to aid in the reception of other signals/channels in the DL, e.g., PDSCH, PDCCH, other CSI-RS, etc. The indication of the TCI state to aid in reception of a DL signal is performed through either dynamic or semi-static signaling, i.e., via DCI, MAC-CE, or by RRC depending on the DL signal to be received. For example, for reception of PDCCH, a TCI state is indicated by MAC-CE signaling.

QCL TypeD is related to the spatial domain receiver settings in the UE, i.e., the setting of the spatial domain receive filter (receive beamforming weights). Hence, if TypeD is configured for one of the reference signals of the indicated TCI state for reception of a DL signal, e.g., PDCCH, it tells the UE that it can receive the PDCCH with the same spatial domain receiver settings as it used to receive the reference signal configured with TypeD within the TCI state. The implicit assumption is that the UE has previously performed measurements on this reference signal and "remembers" which spatial domain receiver settings it used for reception of that reference signal. In other words, the TCI state provides a means to indicate to the UE which receive beam to use for reception of the DL signal, e.g., PDCCH.

```
TCI-State ::=          SEQUENCE {
  tci-StateId            TCI-StateId,
  qcl-Type1              QCL-Info,
  qcl-Type2              QCL-Info          OPTIONAL,       -- Need R
  ...
}
QCL-Info ::=           SEQUENCE {
  cell                   ServCellIndex     OPTIONAL,   -- Need R
  bwp-Id                 BWP-Id            OPTIONAL, -- Cond CSI-RS-Indicated
  referenceSign          CHOICE {
    csi-rs                 NZP-CSI-RS-ResourceId,
    ssb                    SSB-Index
  },
  qcl-Type                   ENUMERATED {typeA, typeB, typeC, typeD},
  ...
}
```

| QCL-Info field descriptions |
| --- |
| bwp-Id<br>The DL BWP which the RS is located in.<br>cell<br>The UE's serving cell in which the referenceSignal is configured. If the field is absent, it applies to the serving cell in which the TCI-State is configured. The RS can be located on a serving cell other than the serving cell in which the TCI-State is configured only if the qcl-Type is configured as typeC or typeD. See TS 38.214 clause 5.1.5.<br>referenceSignal<br>Reference signal with which quasi-collocation information is provided as specified in TS 38.214 subclause 5.1.5.<br>qcl-Type<br>QCL type as specified in TS 38.214 subclause 5.1.5. |

| Conditional Presence | Explanation |
| --- | --- |
| CSI-RS-Indicated | This field is mandatory present if csi-rs is included, absent otherwise |

MAC-CE Activation of TCI State for PDCCH

The indication (activation) of the TCI state to aid in reception of PDCCH is performed by MAC-CE signaling according to the following extract from 3GPP TS 38.321. The underlined text covers the case where MAC-CE activates the TCI state for CORESET0. When MAC-CE indicates (activates) the TCI state for CORESET0, then this TCI state is used for the reception of PDCCH detected in any search space that has configured association to CORSESET0, e.g., a search space with index 0, SS0.

TCI State Indication for UE-specific PDCCH MAC CE.

The TCI State Indication for UE-specific PDCCH MAC CE is identified by a MAC subheader with LCID as specified in Table 6.2.1-1 of TS 38.321. It has a fixed size of 16 bits with following fields:

Serving Cell ID: This field indicates the identity of the Serving Cell for which the MAC CE applies. The length of the field is 5 bits. If the indicated Serving Cell is configured as part of a simultaneousTCI-UpdateList1 or simultaneousTCI-UpdateList2 as specified in TS 38.331, this MAC CE applies to all the Serving Cells in the set simultaneousTCI-UpdateList1 or simultaneousTCI-UpdateList2, respectively;

CORESET ID: This field indicates a Control Resource Set identified with ControlResourceSetId as specified in TS 38.331, for which the TCI State is being indicated. In case the value of the field is 0, the field refers to the Control Resource Set configured by controlResourceSetZero as specified in TS 38.331. The length of the field is 4 bits;

TCI State ID: This field indicates the TCI state identified by TCI-StateId as specified in TS 38.331 applicable to the Control Resource Set identified by CORESET ID field. If the field of CORESET ID is set to 0, this field indicates a TCI-StateId for a TCI state of the first 64 TCI-states configured by tci-StatesToAddModList and tci-StatesToReleaseList in the PDSCH-Config in the active bandwidth part (BWP). If the field of CORESET ID is set to the other value than 0, this field indicates a TCI-StateId configured by tci-StatesPDCCH-ToAddList and tci-StatesPDCCH-ToReleaseList in the controlResourceSet identified by the indicated CORESET ID. The length of the field is 7 bits. Through indication (activation) of a TCI state, the UE is able to know which direction to tune its receive beam towards the serving gNB for reception of a particular signal or channel, e.g., PDCCH. Based on prior UE measurements and reporting to the gNB, the gNB is able to know how to tune its Tx beam towards the UE. An illustrative example is shown in FIG. 2 which shows a UE Rx beam adjustment with mobility. A gNB with analog beamforming capability can only transmit in the DL in one direction (per antenna panel) at a time. To solve this, the gNB can periodically sweep through all beams in the cell and the UE measures and reports the receive signal strength back to the gNB corresponding to one or more beams with the largest signal strength.

FIG. 2 also shows that as the UE moves within a cell, it will need to adjust (change) its receive beam. To aid the UE in such an Rx beam change and maintain the link to the gNB, the gNB can indicate (activate) a new TCI state from a list of: TCI states configured to the UE. The TCI state update will typically come as a response to that the UE has reported a stronger received power for a different reference signal, e.g., SSB6 in FIG. 2.

For the case of a Type0/0A/2 PDCCH detected in search space 0 (SS0) associated with CORESET0, the TCI state update procedure is described in 3GPP TS 38.213 as follows: If a UE is provided a zero value for searchSpaceID in PDCCH-ConfigCommon for a Type0/0A/2-PDCCH CSS set, the UE determines monitoring occasions for PDCCH candidates of the Type0/0A/2-PDCCH CSS set as described in clause 13, and the UE is provided a C-RNTI, the UE monitors PDCCH candidates only at monitoring occasions associated with a SS/PBCH block, where the SS/PBCH block is determined by the most recent of (1) a MAC CE activation command indicating a TCI state of the active BWP that includes a CORESET with index 0, as described in TS 38.214, where the TCI-state includes a CSI-RS which is quasi-co-located with the SS/PBCH block, or (2) a random access procedure that is not initiated by a PDCCH order that triggers a contention-free random access procedure This procedure also states where the UE shall monitor for the CSS PDCCH. The time domain location (i.e., slot) of the monitoring occasions is a function of the SS/PBCH block determined according to the above procedure.

SUMMARY OF THE INVENTION

A user equipment (UE) performs multi-slot physical downlink control channel (PDCCH) monitoring. In one aspect a method is performed by the UE for performing multi-slot PDCCH monitoring, the method including receiving a search space configuration from a network node; determining a search space monitoring slot within a first X-slot group of a fixed pattern of X-slot groups based on a location of the first slot of type0 Common Search Space (CSS) monitoring occasions; determining which one or more slot indices to monitor; determining which one or more symbols to monitor within the determined one or more slot indices, and monitoring the determined symbols within the determined slots for PDCCH. The fixed pattern of X-slot groups may be common to all UEs and a location of Y slot(s) within an X-slot group can be different for different UEs based on a preferred SS/PBCH block index determined by each UE. The method may further include determining a start of the fixed pattern of X-slot groups based on a location of a first slot of a frame or a subframe. The method may further include receiving an instruction from the network node to change a type0 PDCCH monitoring location; determining a new value for the determined search space monitoring slot; and determining which one or more slot indices to monitor according to the determined new value for the determined search space monitoring slot. The method may further include autonomously determining a new type0 PDCCH monitoring location during a random access procedure (RACH) including determining a new value of $n_0$ based on a preferred SS/PBCH block detected by the UE that is associated with a random access occasion (RO) used by the UE during the RACH procedure. The location of Y slot(s) within an X-slot group may be located at the beginning of that X-slot group, and where a location of the X-slot groups can be different for different UEs based on a preferred SS/PBCH block index determined by each UE. The method may further include determining a start of the fixed pattern of X-slot groups based on a location of a first slot of type0 CSS monitoring occasions. The method may further include receiving an instruction from the network node to change a type0 PDCCH monitoring location; and determining which one or more slot indices to monitor for all search spaces according to a new first slot of a type0 CSS monitoring occasion.

The search space configuration may include a period in terms of X-slot groups; an offset in terms of X-slot groups within the period; a duration in terms of X-slot groups within the period; and a parameter that indicates which one or more symbols to monitor within a slot. Determining which one or more slot indices to monitor may be defined by the equation:

$$(\text{period} * p + \text{offset} + y) * X + n_0 \text{ modulo } X$$

where y=0, 1, . . . , (duration−1); wherein p=0, 1, 2, . . . .

The search space configuration may include a first period in terms of slots, a first offset in terms of slots, a first duration in terms of slots, and a parameter that indicates which one or more symbols to monitor within a slot. The method may further include determining a reinterpreted search space configuration including determining a second period, a second offset, and second duration, in terms of X-slot groups as a floor (period/X), floor (offset/X), and floor(duration/X) respectively; and where determining the which one or more slot indices to monitor may be based on the reinterpreted search space configuration. Determining which one or more slot indices to monitor may be defined by the equation: $(\text{period}*p+\text{offset}+y)*X+n_0$ modulo X, where y=0, 1, . . . , (second duration−1); wherein p=0, 1, 2, . . . . Determining which one or more symbols to monitor within the determined one or more slot indices based on the received search space configuration includes applying the parameter that indicates which one or more symbols to monitor within a slot to each of the determined one or more slot indices. The search space configuration may further include an additional offset in terms of X-slot groups within the period, and where determining which one or more slot indices to monitor the search space may account for the additional offset.

BRIEF DESCRIPTION OF THE DRAWINGS

The invention may best be understood by referring to the following description and accompanying drawings that are used to illustrate embodiments of the invention. In the drawings:

FIG. 1 shows a reduction of the periodicity of PDCCH monitoring at a UE to allow more time for the UE to process the PDCCH candidates and is a case where the UE is configured to monitor PDCCH candidates every slot bundle with bundling size X=4 slots.

DETAILED DESCRIPTION

Figure 2:
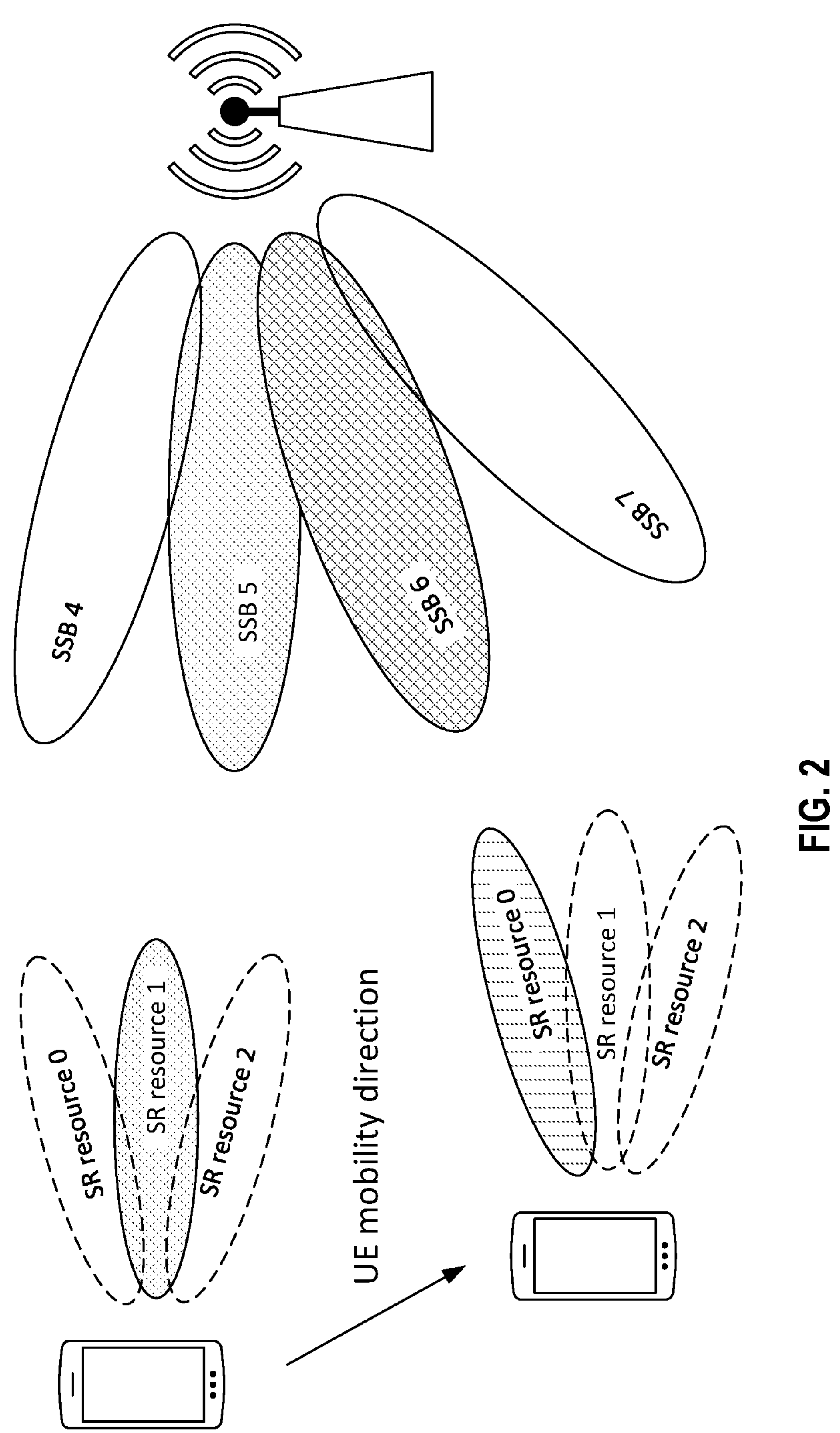
FIG. 2 shows a UE Rx beam adjustment with mobility.

There currently exist certain challenge(s). For the large subcarrier spacings (e.g., 480, 960 kHz) introduced in Rel-17, reducing the periodicity of PDCCH monitoring at the UE side can allow more time for the UE to process the PDCCH candidates since the slot duration for the large SCSs becomes quite short. However, it is important to simultaneously consider both UE capability and gNB/network scheduling flexibility. What is needed from a gNB point of view is to be able to stagger USSs for different UEs in different slots based on the preferred spatial beams.

In the 3GPP RAN1 #104bis-e meeting discussion on Apr. 12-20, 2021, three alternatives were proposed to define a multi-slot PDCCH monitoring capability suitable for the new large SCSs.

Alternative 1: Use a fixed pattern of slot groups as the baseline to define the new capability. Each slot group consists of X slots. Slot groups are consecutive and non-overlapping. The capability indicates the BD/CCE budget within Y consecutive slots in each slot group. The location of the Y slots within the X slots is maintained across different slot groups. Further discuss down-selection of Y within 1<=Y<=X/2 (both in units of slot) when X>1. FFS: Further definition of capabilities. FFS: The following issues for the search space configuration discussion: whether a slot group is aligned with a slot boundary; and restrictions on location of the Y slots within a slot group, e.g., whether to restrict the location of a SS to be within the first Y slots within a slot group. FFS: What the UE capability defines for monitoring within the Y slots.

Alternative 2: Use an (X, Y) span as the baseline to define the new capability. X is the minimum time separation between the start of two consecutive spans. The capability indicates the BD/CCE budget within a span of at most Y consecutive [symbols or slots]. Y<=X. FFS: Exact values of X and Y and units in which they are defined (e.g., symbols, slots), including cases where a span is longer than one slot or crosses a slot boundary. FFS: What is a span pattern, how it is defined and whether it is supported. If it is supported, whether number of slots within which the span pattern is repeated is needed, and if needed, the value of the number of slots. FFS: Further definition of capabilities.

Alternative 3: Use a sliding window of X slots as the baseline to define the new capability. The capability indicates the BD/CCE budget within the sliding window. The sliding unit of the sliding window is [1] slot. FFS: Further definition of capabilities.

In terms of UE energy savings, smaller Y values (e.g., Y<1 slot) are preferred. However, as described in the above, the current initial access procedure is built on UE monitoring two consecutive slots for type0 PDCCH. Furthermore, it has been recognized that none of the three alternatives with small Y values and without further changes can support mobility-induced TCI state changes where the time domain monitoring location associated with an SS/PBCH block needs to change.

Certain aspects of the disclosure and their embodiments may provide solutions to these or other challenges. Two novel approaches are described to solve the problems identified above. In a first approach, the fixed pattern of X-slot (where X is an integer) groups is common to all UEs but the locations of the Y slots (where Y is an integer) within a X-slot group are different for different UEs based on the preferred SS/PBCH block index determined by each UE. The preferred SS/PBCH block is the one that the UE can receive with higher reliability compared to other SS/PBCH blocks. In a second approach, the Y slots are always located at the beginning of a X-slot group, but the locations of the X-slot groups are different for different UEs based on the preferred SS/PBCH block index determined by each UE.

For either approach, a search space can be configured with a granularity of X-slot groups (which includes the periodicity in terms of X-slot groups, offset in terms of X-slot groups within the period, and duration in terms of X-slot groups within the period). However, the slot location of the search spaces within an X-slot group is not configurable. Rather, for a given UE, they are confined within the same Y-slot duration, and the Y slot duration has location corresponding to the first slot of the Type0 CSS within an X-slot group determined by that UE.

The parameter monitoringSymbolsWithinSlot functions are according to the current NR system operation.

Certain embodiments may provide one or more of the following technical advantage(s). The solutions allow UE energy saving by supporting small Y values and mobility-induced spatial relationship changes, and simultaneously allows network flexibility for stagger UE specific search spaces in different slots.

Some of the embodiments contemplated herein will now be described more fully with reference to the accompanying drawings. Embodiments are provided by way of example to convey the scope of the subject matter to those skilled in the art.

Figure 3:
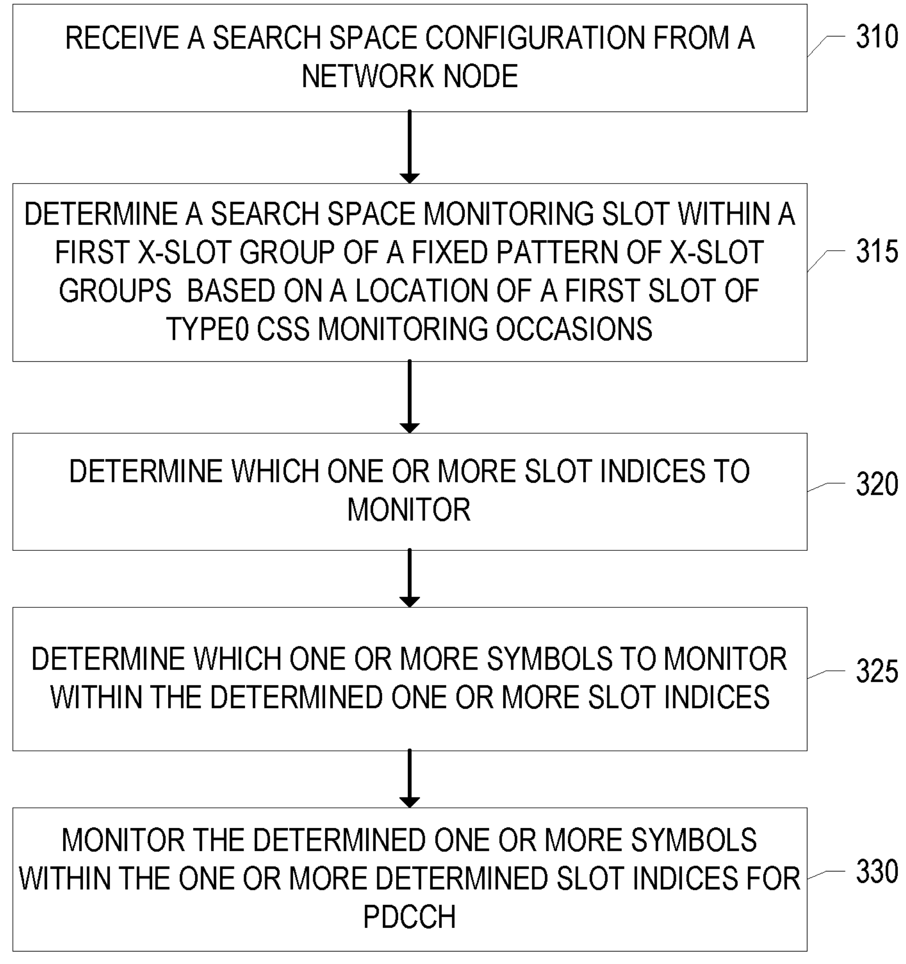
FIG. 3 is a flow diagram that illustrates exemplary operations performed by a user equipment for multi-slot PDCCH monitoring according to an embodiment.

FIG. 3 is a flow diagram that illustrates exemplary operations performed by a user equipment for multi-slot PDCCH monitoring according to an embodiment. At operation 310, the UE receives a search space configuration from a network node such as a gNB. In an embodiment, the search space configuration includes: a period in terms of X-slot groups; an offset in terms of X-slot groups within the period; a duration in terms of X-slot groups within the period; and a parameter that indicates which one or more symbols to monitor within a slot (e.g., monitoringSymbolsWithinSlot). In another embodiment, the search space configuration includes: a period in terms of slots; an offset in terms of slots; a duration in terms of slots; and a parameter that indicates which one or more symbols to monitor within a slot (e.g., monitoringSymbolsWithinSlot). In this embodiment, the UE may determine the period, offset, and duration in terms of X-slot groups as floor(period/X), floor(offset/X), and floor(duration/X), respectively.

At operation 315, the UE determines a search space monitoring slot within a first X-slot group of a fixed pattern of X-slot groups (denoted as the monitoringSlotWithinSlotGroup) based on the location of the first slot of the type0 CSS monitoring occasions (denoted by $n_0$ in the current NR system specs). As one nonlimiting embodiment, the UE determines $$monitoringSlotWithinSlotGroup = n_0 \text{ modulo } X$$

where $n_0$, as described herein in the search space sets section, is determined based on the current NR system specs.

In an embodiment, the fixed pattern of X-slot groups is common to all UEs and the locations of the Y slots within a X-slot group are different for different UEs based on the preferred SS/PBCH block index determined by each UE. The preferred SS/PBCH block is the one that the UE can receive with higher reliability compared to other SS/PBCH blocks. In such an embodiment, which is described in more detail with respect to Embodiments 1A and 1B herein, for a given X-slot group size, the X-slot group pattern is fixed relative to a reference time location and common for all UEs operating PDCCH monitoring every X slots.

In another embodiment, the location of Y slots within an X-slot group is located at the beginning of that X-slot group and the location of the X-slot groups can be different for different UEs based on a preferred SS/PBCH block index determined by each UE. In such an embodiment, which is described in more detail with respect to Embodiments 2A and 2B herein, the search space monitoring slot within an X-slot group is always at the beginning of an X-slot group (e.g., monitoringSlotWithinSlotGroup=0); and the UE determines the start of an X-slot group based on the location of the first slot of the type0 CSS monitoring occasions.

At operation 320, the UE determines the slot indice(s) to monitor. As an example, if the search space configuration includes a period in terms of X-slot groups, an offset in terms of X-slot groups within the period, and a duration in terms of X-slot groups within the period, the UE can determine the slot indices as follows:

$$(\text{period} * p + \text{offset} + y) * X + monitoringSlotWithinSlotGroup$$

where y=0, 1, . . . , (duration−1); and p=0, 1, 2, . . . . As another example, if the search space configuration includes a period in terms of slots, an offset in terms of slots, and a duration in terms of slots, the UE may determine a reinterpreted search space configuration including determining a reinterpreted period, a reinterpreted offset, and a reinterpreted duration in terms of X-slot groups. This may be done as a floor (period/X), floor (offset/X), and floor(duration/X) respectively. The UE can determine the slot indices as follows:

$$(\text{reinterpreted\_period} * p + \text{reinterpreted\_offset} + y) * X + monitoringSlotWithinSlotGroup$$

where y=0, 1, . . . , (reinterpreted_duration−1); and p=0, 1, 2, . . . .

The search space configuration may include an additional offset in terms of X-slot groups within the period. In such a case, determining the slot indices to monitor may further account for this additional offset, which is described in more detail in embodiments 1B and 2B herein.

At operation 325, the UE determines which symbol(s) to monitor within the determined slot indices. For example, the UE can apply the monitoringSymbolsWithinSlot parameter to each of the monitoring slot(s) to determine which symbols within the slot to monitor according to the current NR specs.

At operation 330, the UE monitors the determined symbol(s) within the determined slot indices for PDCCH.

The UE may change the type0 PDCCH monitoring location. In an embodiment, the UE receives an instruction from the network node to change the type0 PDCCH monitoring location(s) (e.g., change in $n_0$). The instruction from the network can be a MAC-CE activation of a new TCI state, where the TCI state is either configured with the ID of an SS/PBCH block or is configured with the ID of a channel state information reference signal (CSI-RS) that is quasi co-located (QCL'd) with an SS/PBCH block. Responsive to receiving this instruction, the UE determines a new value for the search space monitoring slot (e.g., monitoringSlotWithinSlotGroup). The new value for the search space monitoring slot may be determined according to the new type0 PDCCH monitoring location(s). In another embodiment, rather than receiving an explicit instruction from the network node to change the type0 PDCCH monitoring location, the UE autonomously determines a new type0 PDCCH monitoring location during a random access procedure (RACH). In this variation, the UE determines a new value of $n_0$ based on a preferred SS/PBCH block detected by the UE which is associated with a random access occasion (RO) used by the UE during the RACH procedure. The UE determines which one or more slot indices to monitor all search spaces according to the new search space monitoring slot (e.g., the new monitoringSlotWithinSlotGroup).

Embodiment 1A—Common Fixed Pattern of X-Slot Groups

Figure 4:
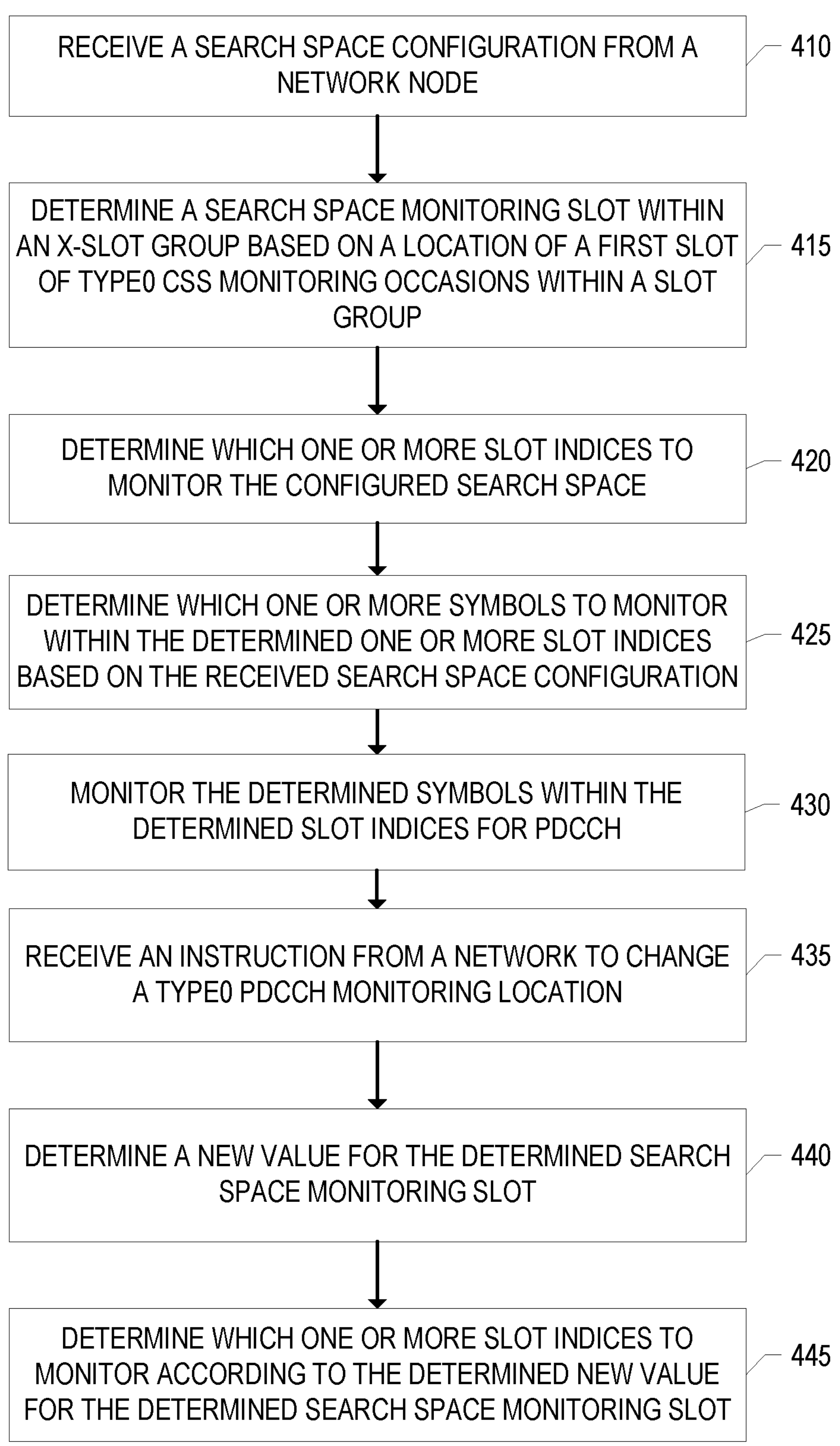
FIG. 4 is a flow diagram that shows exemplary operations performed by a user equipment for multi-slot PDCCH monitoring according to an embodiment.

Embodiment 1A is described with respect to the exemplary flow diagram of FIG. 4, which shows exemplary operations performed by a user equipment for multi-slot PDCCH monitoring according to an embodiment. In FIG. 4, for a given X slot group size, the X-slot group pattern is fixed relative to a reference time location and common for all UEs operating PDCCH monitoring every X slots. For example, the X-slot group starts from the first slot in an even indexed radio frame.

At operation 410, a UE receives a search space configuration from a network node (e.g., SearchSpace). The search space configuration may include the following:

- a period in terms of X-slot groups;
- an offset in terms of X-slot groups within the period;
- a duration in terms of X-slot groups within the period; and
- a parameter that indicates which one or more symbols to monitor within a slot (e.g., monitoringSymbolsWithinSlot).

At operation 415, the UE determines the search space monitoring slot within an X-slot group (denoted as the monitoringSlotWithinSlotGroup) based on the location of the first slot of the type0 CSS monitoring occasions (denoted by $n_0$ in the current NR system specs) within a slot group. As one nonlimiting embodiment, the UE determines $$monitoringSlotWithinSlotGroup = n_0 \text{ modulo } X$$

where $n_0$, as described herein in the search space sets section, is determined based on the current NR system specs.

At operation 420, the UE determines the slot indices to monitor the configured search space. This may be done as follows:

$$(\text{period} * p + \text{offset} + y) * X + monitoringSlotWithinSlotGroup$$

where y=0, 1, . . . , duration−1 and p=0, 1, 2, . . . . At operation 425, the UE determines the symbol(s) to monitor within the determined slot indices based on the received search space configuration. For example, the UE applies the monitoringSymbolsWithinSlot parameter is applied to each of the monitoring slot(s) to determine which symbols within the slot to monitor according to the current NR specs. At operation 430, the UE monitors the determined symbol(s) within the determined slot indices for PDCCH.

At some point, the UE may change the type0 PDCCH monitoring location. At operation 435, the UE receives an instruction from the network node to change the type0 PDCCH monitoring location(s) (e.g., change in $n_0$). The instruction from the network can be a MAC-CE activation of a new TCI state, where the TCI state is either configured with the ID of an SS/PBCH block or is configured with the ID of a channel state information reference signal (CSI-RS) that is quasi co-located (QCL'd) with an SS/PBCH block. Responsive to receiving this instruction, the UE determines a new value for the search space monitoring slot (e.g., monitoringSlotWithinSlotGroup) at operation 440. The new value for the search space monitoring slot may be determined according to the new type0 PDCCH monitoring location(s). At operation 445, the UE determines which one or more slot indices to monitor all search spaces according to the new search space monitoring slot (e.g., the new monitoringSlotWithinSlotGroup). The UE then monitors the determined symbol(s) in the new slot indices.

In a variation, rather than receiving an explicit instruction from the network node to change the type0 PDCCH monitoring location, the UE autonomously determines a new type0 PDCCH monitoring location during a random access procedure (RACH). In this variation, the UE determines a new value of $n_0$ based on a preferred SS/PBCH block detected by the UE which is associated with a random access occasion (RO) used by the UE during the RACH procedure.

As a nonlimiting exemplary embodiment, the UE receives a search space configuration from a network node (e.g., gNB) for the case X=4:

period of 5 X-slot groups;

offset of 1 X-slot group within the period; and duration 2 X-slot groups within the period.

Figures 5, 6:
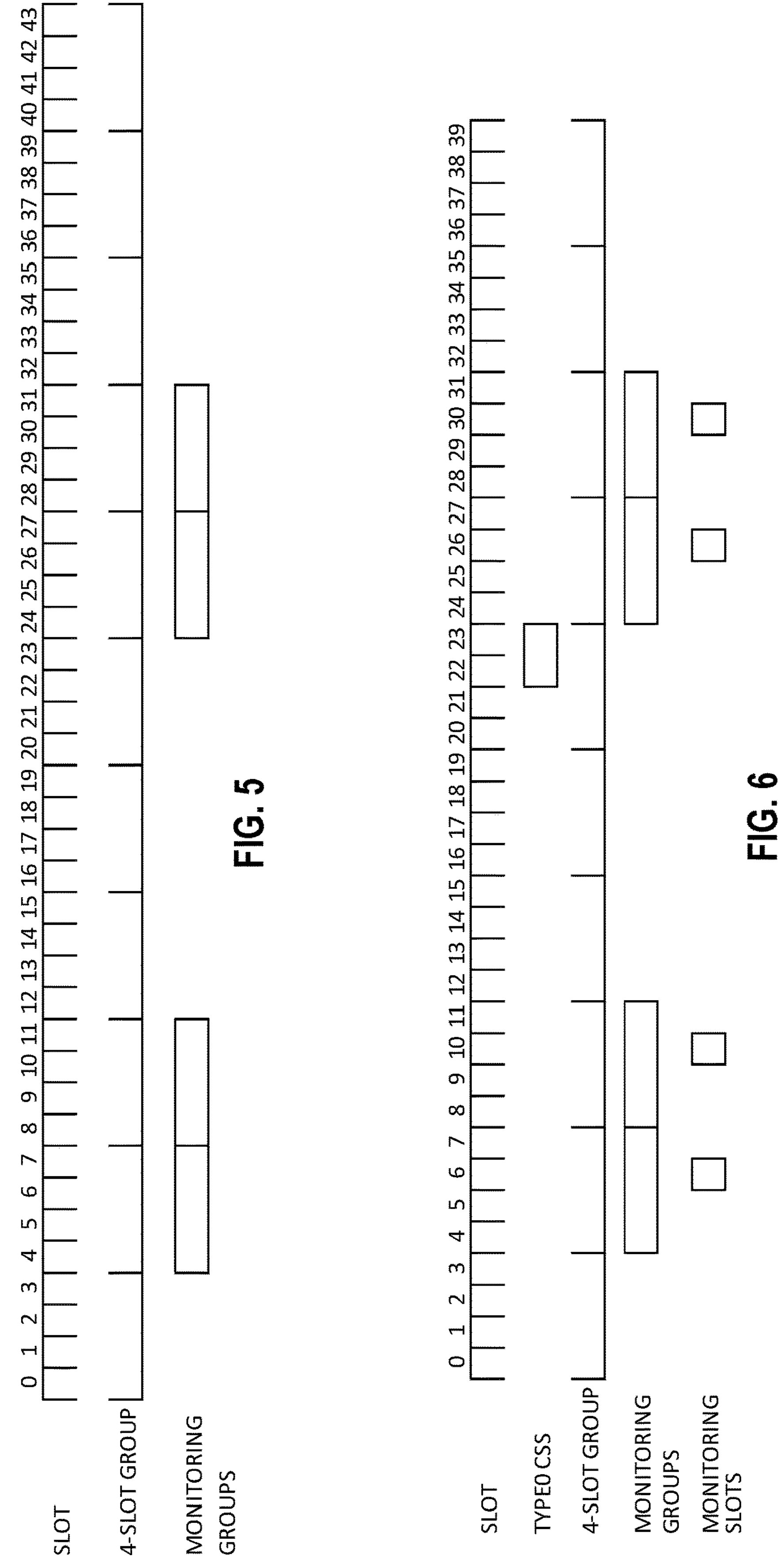
FIG. 5 shows an example of the X-slot groups that will contain the search space monitoring occasions according to an embodiment.
FIG. 6 shows an example with a search space configuration of x=4, periodicity of 5 x-slot groups, offset of 1 x-slot group, and duration of 2 x-slot groups, where the type0 CSS monitoring occasion is slot 22, according to an embodiment.

The X-slot groups that will contain the search space monitoring occasions as illustrated in FIG. 5. In FIG. 5, the search space configuration is x=4, periodicity of 5 x-slot groups, offset of 1 x-slot group, and duration of 2 x-slot groups.

Furthermore, suppose the first slot of the type0 CSS monitoring occasions is $n_0$=22. The UE thus determines $$monitoringSlotWithinSlotGroup = 22 \text{ modulo } 4 = 2.$$

This monitoringSlotWithinSlotGroup is then applied to the configured search space as illustrated in FIG. 6, which are calculated as $$(5*p+1+y)*4+2 \text{ for } y=0, 1 \text{ and } p=0, 1, 2, \ldots$$

FIG. 6 shows an illustrative search space configuration of x=4, periodicity of 5 x-slot groups, offset of 1 x-slot group, and duration of 2 x-slot groups, where the type0 CSS monitoring occasion is slot 22.

Finally, the configured monitoringSymbolsWithinSlot is applied to the determined monitoring slots for the configured search space.

Embodiment 1B—Extensions for Common Fixed Pattern of X-Slot Groups

As an extension to embodiment 1A, a UE receives an extraSlotOffsetWithinSlotGroup parameter in addition to the search space configuration as in embodiment 1A. The UE determines the monitoringSlotWithinSlotGroup as in embodiment 1A.

The UE determines the slot indices to monitor the configured search space as follows:

$$(\text{period}*p+\text{offset}+y)*X+ monitoringSlotWithinSlotGroup+extraSlotOffsetWithinSlotGroup$$

where y=0, 1, . . . , duration−1 and p=0, 1, 2, . . . .

Alternatively, the UE determines the slot indices to monitor the configured search space as follows:

$$(\text{period}*p+\text{offset}+y)*X+ ((monitoringSlotWithinSlotGroup+extraSlotOffsetWithinSlotGroup) \text{ modulo } X)$$

where y=0, 1, . . . , duration−1 and p=0, 1, 2, . . . .

Another alternative is for the UE to determine the slot indices to monitor the configured search space as follows:

$$(\text{period}*p+\text{offset}+y)*X+ ((n_0+extraSlotOffsetWithinSlotGroup) \text{ modulo } X)$$

where y=0, 1, . . . , duration−1 and p=0, 1, 2, . . . .

Embodiment 2A—UE-Specific Fixed Pattern of X-Slot Groups

Figure 7:
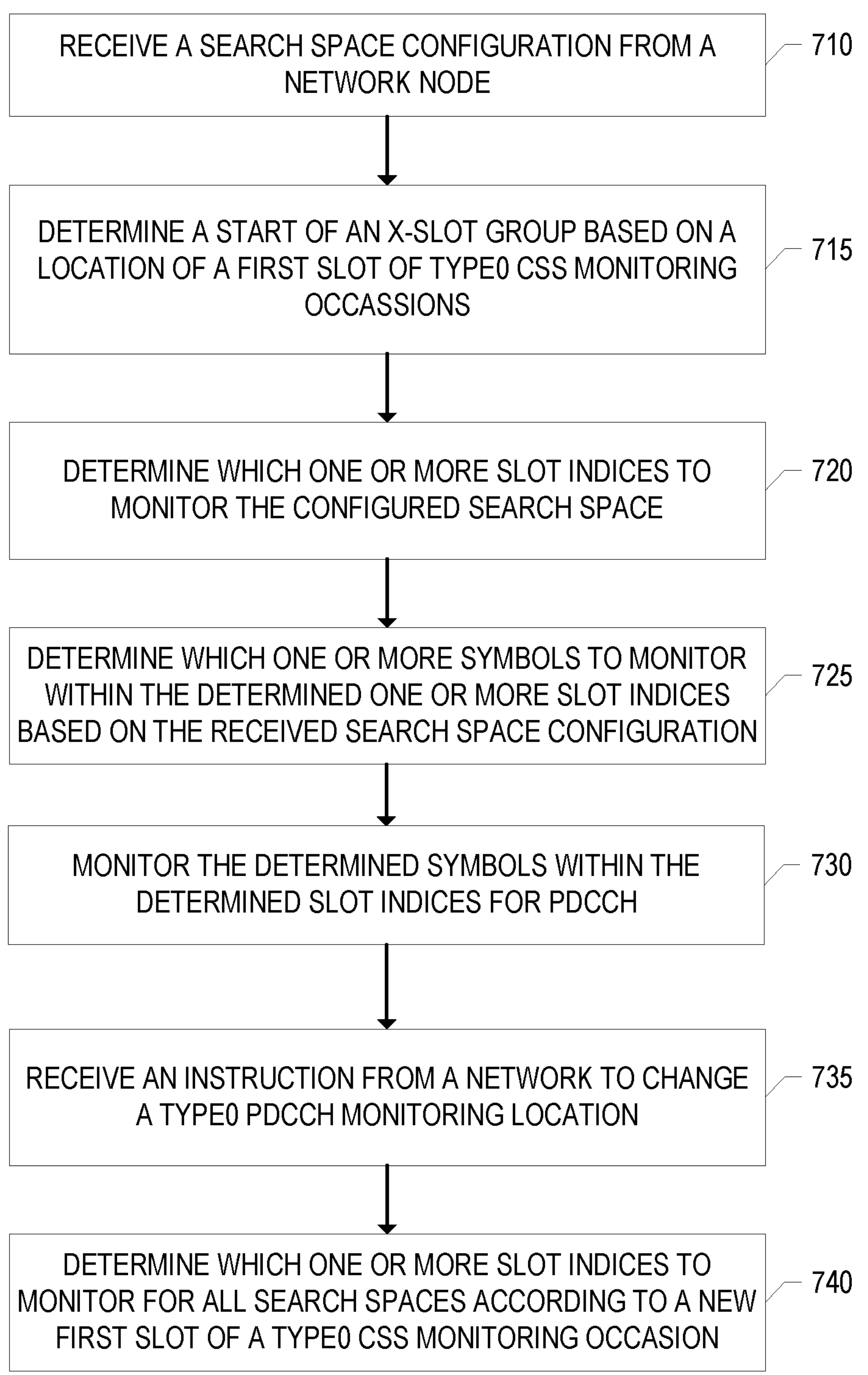
FIG. 7 is a flow diagram that shows exemplary operations performed by a user equipment for multi-slot PDCCH monitoring according to an embodiment.

Embodiment 2A is described with respect to the exemplary flow diagram of FIG. 7, which shows exemplary operations performed by a user equipment for multi-slot PDCCH monitoring according to an embodiment.

At operation 710, a UE receives a search space configuration from a network node such as a gNB. The search space configuration may include the following:

period in terms of X-slot groups;

offset in terms of X-slot groups within the period;

duration in terms of X-slot groups within the period; and a parameter that indicates which one or more symbols to monitor within a slot (e.g., monitoringSymbolsWithinSlot).

In this embodiment, the search space monitoring slot within a X-slot group is always at the beginning of a X-slot group (e.g., monitoringSlotWithinSlotGroup=0).

However, the UE determines the start of a X-slot group based on the location of the first slot of the type0 CSS monitoring occasions (denoted by $n_0$ in the current NR system specs). Thus, at operation 715, the UE determines the start of an X-slot group based on a location of a first slot of type0 CSS monitoring occasions. That is, a X-slot group consists of the X slots starting from a slot with index n:

$$n = X*p+(n_0 \text{ modulo } X)$$

where p=0, 1, 2, . . . .

At operation 720, the UE determines the slot indices to monitor the configured search space. This may be done as follows:

$$(\text{period}*p+\text{offset}+y)*X+(n_0 \text{ modulo } X)$$

where y=0, 1, . . . , duration−1 and p=0, 1, 2, . . . . At operation 725, the UE determines the symbol(s) to monitor within the determined based on the received search space configuration. For example, the UE applies the monitoringSymbolsWithinSlot parameter is applied to each of the monitoring slot(s) to determine which symbols within the slot to monitor according to the current NR specs. At operation 730, the UE monitors the determined symbol(s) within the determined slot indices for PDCCH.

At some point, the UE may change the type0 PDCCH monitoring location. At operation 735, the UE receives an instruction from the network node to change the type0 PDCCH monitoring location(s) (e.g., change in $n_0$). The instruction from the network can be a MAC-CE activation of a new TCI state, where the TCI state is either configured with the ID of an SS/PBCH block or is configured with the ID of a channel state information reference signal (CSI-RS) that is quasi co-located (QCL'd) with an SS/PBCH block. Responsive to receiving this instruction, the UE determines slot indices to monitor for all search spaces according to the new first slot of the type0 CSS monitoring occasions (denoted by $n_0$ in the current NR system specs) at operation 740. The UE then monitors the determined symbol(s) in the new slot indices.

In a variation, rather than receiving an explicit instruction from the network node to change the type0 PDCCH monitoring location the UE autonomously determines a new type0 PDCCH monitoring location during a random access procedure (RACH). In this variation, the UE determines a new value of $n_0$ based on a preferred SS/PBCH block detected by the UE which is associated with a random access occasion (RO) used by the UE during the RACH procedure.

As a nonlimiting exemplary embodiment, the UE receives a search space configuration from a network node for the case X=4:

period of 5 X-slot groups;

offset of 1 X-slot group within the period; and duration 2 X-slot groups within the period.

Figure 8:
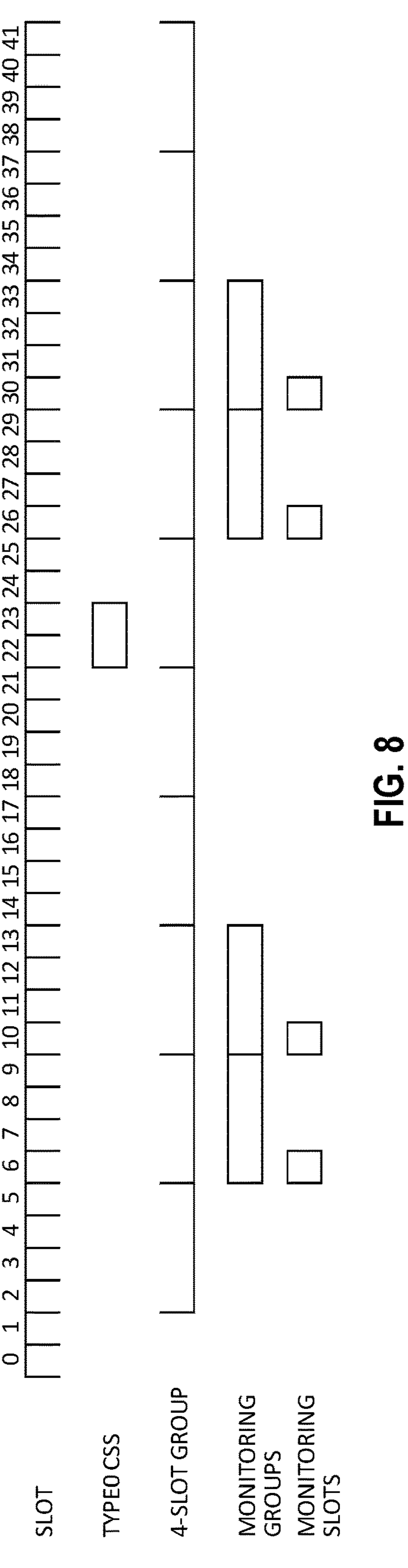
FIG. 8 shows an example with a search space configuration is x=4, periodicity of 5 x-slot groups, offset of 1 x-slot group, and duration of 2 x-slot groups, according to an embodiment.

Furthermore, suppose the first slot of the type0 CSS monitoring occasions is $n_0$=22. The X-slot groups that will contain the search space monitoring occasions and the slots to be monitored for the configured search space are as illustrated in FIG. 8 where the start of the first slot group is aligned with slot 22 modulo 4=2. In FIG. 8, the search space configuration is x=4, periodicity of 5 x-slot groups, offset of 1 x-slot group, and duration of 2 x-slot groups.

Embodiment 2B—Extensions of UE-Specific Fixed Pattern of X-Slot Groups

As an extension to embodiment 2A, a UE receives an extraSlotOffsetWithinSlotGroup parameter in addition to the other search space configuration as in embodiment 2A.

The UE determines the slot indices to monitor the configured search space as follows:

$$(\text{period} * p + \text{offset} + y) * X + (n_0 \text{ modulo } X) + \mathit{extraSlotOffsetWithinSlotGroup}$$

where y=0, 1, . . . , duration−1 and p=0, 1, 2, . . . .

Alternatively, the UE determines the slot indices to monitor the configured search space as follows:

$$(\text{period} * p + \text{offset} + y) * X + ((n_0 + \mathit{extraSlotOffsetWithinSlotGroup}) \text{ modulo } X)$$

where y=0, 1, . . . , duration−1 and p=0, 1, 2, . . . .

Embodiment 3—Extension of Embodiments 1A/1B/2A/2B with Reinterpretation of Existing Slot-Based Search Space Configuration In a variation of any of the above embodiments, the UE receives a legacy search space configuration from a network node as period in terms of slots;

offset in terms of slots;

duration in terms of slots; and a parameter that indicates which one or more symbols to monitor within a slot (e.g., monitoringSymbolsWithinSlot).

The UE then determines the period, offset, and duration in terms of X-slot groups as floor(period/X), floor(offset/X), and floor(duration/X), respectively.

Figure 9:
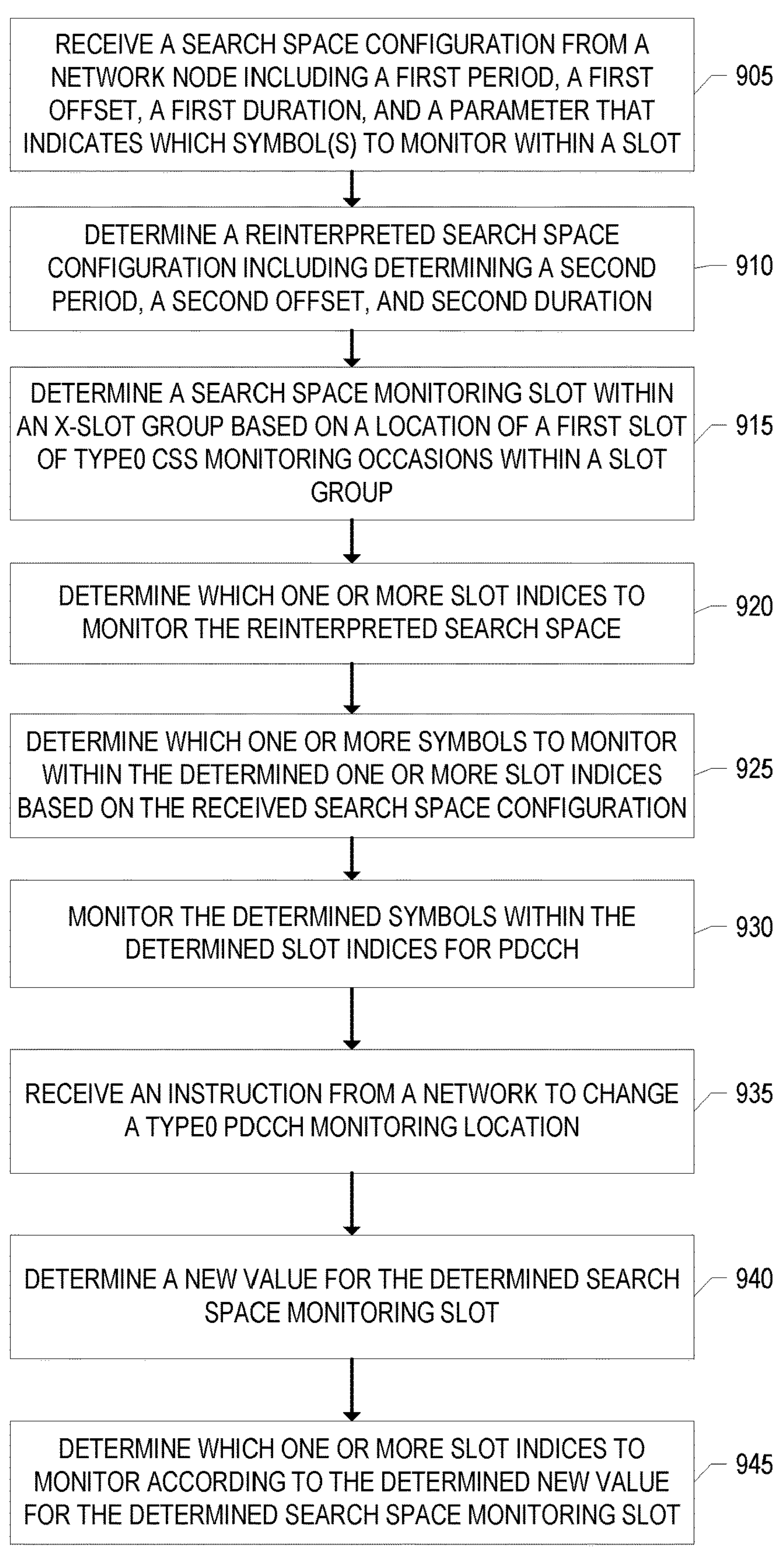
FIG. 9 is a flow diagram that shows exemplary operations performed by a user equipment for multi-slot PDCCH monitoring according to an embodiment.

FIG. 9 is a flow diagram that shows exemplary operations performed by a user equipment for multi-slot PDCCH monitoring according to an embodiment. FIG. 9 is described with respect to the exemplary embodiments 1A, 1B, and 3. At operation 905, a UE receives a search space configuration from a network node such as a gNB. The search space configuration includes a first period in terms of slots, a first offset in terms of slots, a duration in terms of slots, and a parameter that indicates which symbol(s) to monitor within a slot (e.g., monitoringSymbolsWithinSlot).

At operation 910, the UE determines a reinterpreted search space configuration in terms of X-slot groups including determining a second period, a second offset, and a second duration, The second period may be determined as the floor(period/X). The second offset may be determined as the floor(offset/X). The second duration may be determined as the floor(duration/X).

At operation 915, the UE determines the search space monitoring slot within an X-slot group (denoted as the monitoringSlotWithinSlotGroup) based on the location of the first slot of the type0 CSS monitoring occasions (denoted by $n_0$ in the current NR system specs) within a slot group. As one nonlimiting embodiment, the UE determines $$\mathit{monitoringSlotWithinSlotGroup} = n_0 \text{ modulo } X$$

where $n_0$, as described herein in the search space sets section, is determined based on the current NR system specs.

At operation 920, the UE determines the slot indices to monitor the reinterpreted search space. This may be done as follows:

$$(\text{period} * p + \text{offset} + y) * X + \mathit{monitoringSlotWithinSlotGroup}$$

where y=0, 1, . . . , duration−1 and p=0, 1, 2, . . . . At operation 925, the UE determines the symbol(s) to monitor within the determined based on the received search space configuration. For example, the UE applies the monitoringSymbolsWithinSlot parameter is applied to each of the monitoring slot(s) to determine which symbols within the slot to monitor according to the current NR specs. At operation 930, the UE monitors the determined symbol(s) within the determined slot indices for PDCCH.

At some point, the UE may change the type0 PDCCH monitoring location. At operation 935, the UE receives an instruction from the network node to change the type0 PDCCH monitoring location(s) (e.g., change in $n_0$). The instruction from the network can be a MAC-CE activation of a new TCI state, where the TCI state is either configured with the ID of an SS/PBCH block or is configured with the ID of a channel state information reference signal (CSI-RS) that is quasi co-located (QCL'd) with an SS/PBCH block. Responsive to receiving this instruction, the UE determines a new value for the search space monitoring slot (e.g., monitoringSlotWithinSlotGroup) at operation 940. The new value for the search space monitoring slot may be determined according to the new type0 PDCCH monitoring location(s). At operation 945, the UE determines which one or more slot indices to monitor all search spaces according to the new search space monitoring slot (e.g., the new monitoringSlotWithinSlotGroup). The UE then monitors the determined symbol(s) in the new slot indices.

In a variation, rather than receiving an explicit instruction from the network node to change the type0 PDCCH monitoring location, the UE autonomously determines a new type0 PDCCH monitoring location during a random access procedure (RACH). In this variation, the UE determines a new value of $n_0$ based on a preferred SS/PBCH block detected by the UE which is associated with a random access occasion (RO) used by the UE during the RACH procedure.

As an extension to embodiment 3, a UE receives an extraSlotOffsetWithinSlotGroup parameter in addition to the search space configuration. The UE determines the monitoringSlotWithinSlotGroup as described above in embodiment 3.

The UE determines the slot indices to monitor the configured search space as follows:

$$(\text{period} * p + \text{offset} + y) * X + \textit{monitoringSlotWithinSlotGroup} + \textit{extraSlotOffsetWithinSlotGroup}$$

where y=0, 1, . . . , duration−1 and p=0, 1, 2, . . . .

Alternatively, the UE determines the slot indices to monitor the configured search space as follows:

$$(\text{period} * p + \text{offset} + y) * X + ((\textit{monitoringSlotWithinSlotGroup} + \textit{extraSlotOffsetWithinSlotGroup}) \text{ modulo } X)$$

where y=0, 1, . . . , duration−1 and p=0, 1, 2, . . . .

Another alternative is for the UE to determine the slot indices to monitor the configured search space as follows:

$$(\text{period} * p + \text{offset} + y) * X + ((n_0 + \textit{extraSlotOffsetWithinSlotGroup}) \text{ modulo } X)$$

where y=0, 1, . . . , duration−1 and p=0, 1, 2, . . . .

Figure 10:
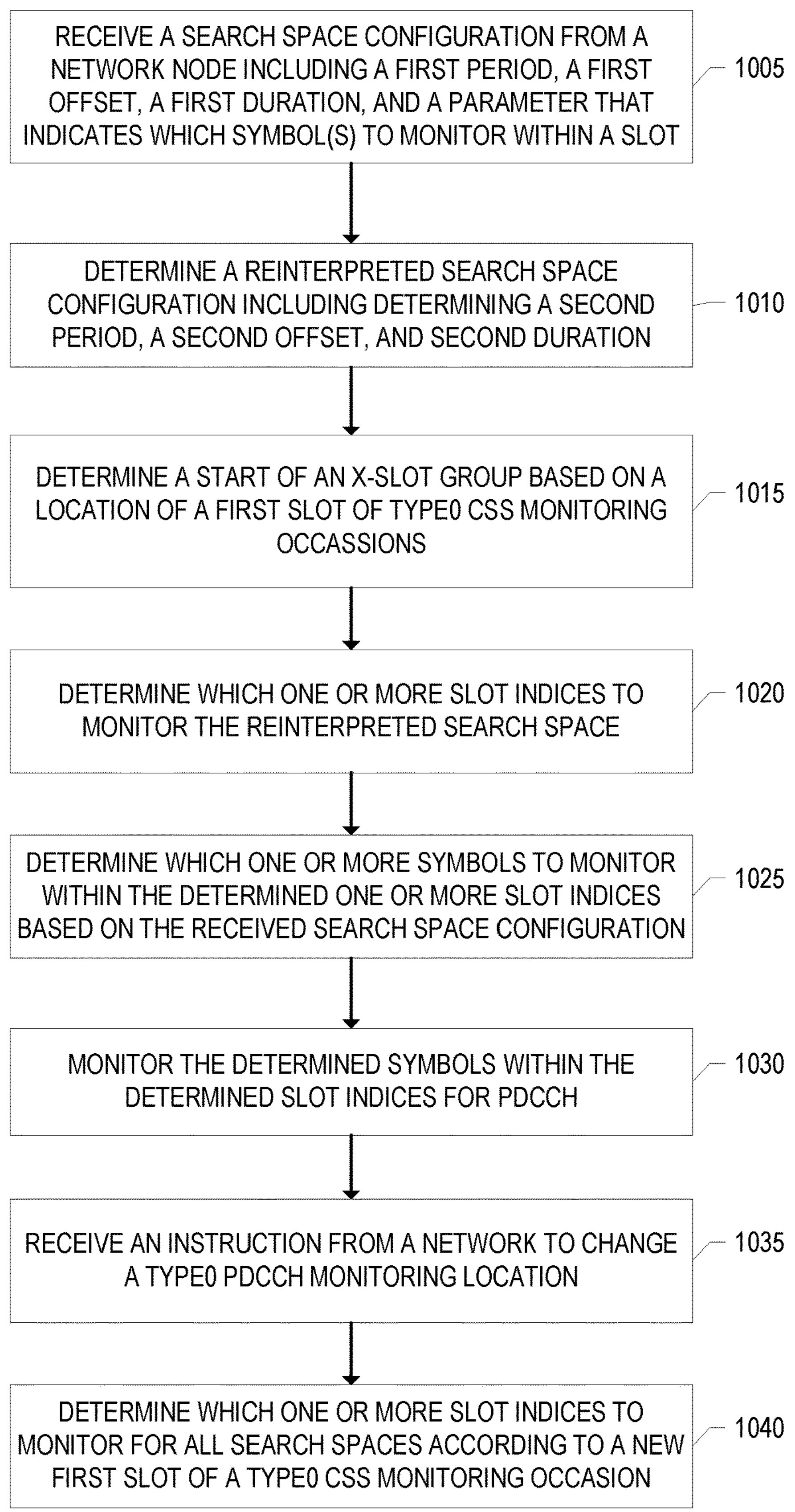
FIG. 10 is a flow diagram that shows exemplary operations performed by a user equipment for multi-slot PDCCH monitoring according to an embodiment/

FIG. 10 is a flow diagram that shows exemplary operations performed by a user equipment for multi-slot PDCCH monitoring according to an embodiment. FIG. 10 is described with respect to the exemplary embodiments 2A, 2B, and 3.

At operation 1005, a UE receives a search space configuration from a network node such as a gNB. The search space configuration includes a first period in terms of slots, a first offset in terms of slots, a duration in terms of slots, and a parameter that indicates which symbol(s) to monitor within a slot (e.g., monitoringSymbolsWithinSlot).

At operation 1010, the UE determines a reinterpreted search space configuration in terms of X-slot groups including determining a second period, a second offset, and a second duration, The second period may be determined as the floor(period/X). The second offset may be determined as the floor(offset/X). The second duration may be determined as the floor(duration/X).

In this embodiment, the search space monitoring slot within a X-slot group is always at the beginning of a X-slot group (e.g., monitoringSlotWithinSlotGroup=0). However, the UE determines the start of a X-slot group based on the location of the first slot of the type0 CSS monitoring occasions (denoted by $n_0$ in the current NR system specs). Thus, at operation 1015, the UE determines the start of an X-slot group based on a location of a first slot of type0 CSS monitoring occasions. That is, a X-slot group consists of the X slots starting from a slot with index n:

$$n = X * p + (n_0 \text{ modulo } X)$$

where p=0, 1, 2, . . . .

At operation 1020, the UE determines the slot indices to monitor the reinterpreted search space. This may be done as follows:

$$(\text{period} * p + \text{offset} + y) * X + (n_0 \text{ modulo } X)$$

where y=0, 1, . . . , duration−1 and p=0, 1, 2, . . . . At operation 1025, the UE determines the symbol(s) to monitor within the determined based on the received search space configuration. For example, the UE applies the monitoringSymbolsWithinSlot parameter is applied to each of the monitoring slot(s) to determine which symbols within the slot to monitor according to the current NR specs. At operation 1030, the UE monitors the determined symbol(s) within the determined slot indices for PDCCH.

At some point, the UE may change the type0 PDCCH monitoring location. At operation 1035, the UE receives an instruction from the network node to change the type0 PDCCH monitoring location(s) (e.g., change in $n_0$). The instruction from the network can be a MAC-CE activation of a new TCI state, where the TCI state is either configured with the ID of an SS/PBCH block or is configured with the ID of a channel state information reference signal (CSI-RS) that is quasi co-located (QCL'd) with an SS/PBCH block. Responsive to receiving this instruction, the UE determines slot indices to monitor for all search spaces according to the new first slot of the type0 CSS monitoring occasions (denoted by $n_0$ in the current NR system specs) at operation 1040. The UE then monitors the determined symbol(s) in the new slot indices.

In a variation, rather than receiving an explicit instruction from the network node to change the type0 PDCCH monitoring location the UE autonomously determines a new type0 PDCCH monitoring location during a random access procedure (RACH). In this variation, the UE determines a new value of $n_0$ based on a preferred SS/PBCH block detected by the UE which is associated with a random access occasion (RO) used by the UE during the RACH procedure.

As an extension to this embodiment, a UE receives an extraSlotOffsetWithinSlotGroup parameter in addition to the other search space configuration as in embodiment 2A.

The UE determines the slot indices to monitor the configured search space as follows:

$$(\text{period} * p + \text{offset} + y) * X + (n_0 \text{ modulo } X) + \textit{extraSlotOffsetWithinSlotGroup}$$

where y=0, 1, . . . , duration−1 and p=0, 1, 2, . . . .

Alternatively, the UE determines the slot indices to monitor the configured search space as follows:

$$(\text{period} * p + \text{offset} + y) * X + ((n_0 + \textit{extraSlotOffsetWithinSlotGroup}) \text{ modulo } X)$$

where y=0, 1, . . . , duration−1 and p=0, 1, 2, . . . .

Embodiment 4

In this embodiment, the UE determines the slot index within an X-slot group for monitoring as in any of Embodiments 1/1A/2A/2B/3. The slot index corresponds to one of a set of Y consecutive slots in the X-slot group where Y<X. The value of Y is defined as either a UE capability on how many slots out of X the UE is capable of monitoring, a value hardwired by specification, or is a value configured to the UE by the network. The UE monitors the configured search space in all or a subset of the Y slots.

Embodiment 5

In a variation of Embodiment 4, the UE monitors one or more search spaces within a first group of search space types within the Y slot(s), but monitors one or more search spaces within a second group of search space types in both the Y slot(s) plus Y1 additional slots. In one exemplary embodiment, the Y1 additional slots are directly adjacent to the Y slots (prior or after).

In one non-limiting example the first and second groups of search space types are comprised as follows:

1st Group: Type1 (configured by RRC), Type-3 CSS, and UE-specific search spaces (USS).

2nd Group: Type 1 (prior to RRC) and Type0/0A/2 CSS

In another non-limiting example, the first and second groups are defined as above, and Y=Y1=1. In this example, the UE monitors the 1st group in only a single slot and monitors the 2nd group in two slots based on the indices $n_0$ and $n_0+1$.

Figure 11:
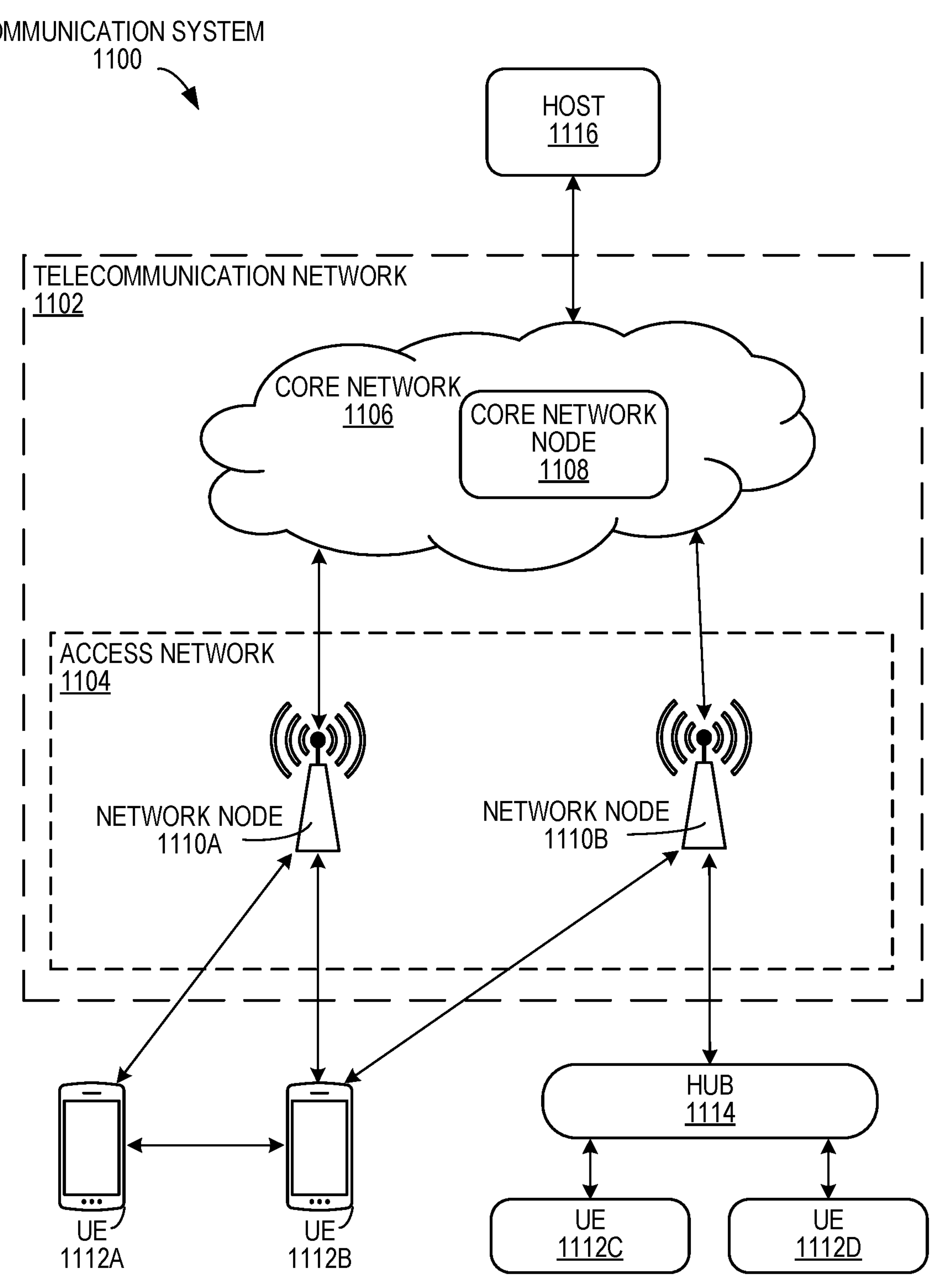
FIG. 11 shows an example of a communication system in accordance with some embodiments.

FIG. 11 shows an example of a communication system 1100 in accordance with some embodiments.

In the example, the communication system 1100 includes a telecommunication network 1102 that includes an access network 1104, such as a radio access network (RAN), and a core network 1106, which includes one or more core network nodes 1108. The access network 1104 includes one or more access network nodes, such as network nodes 1110*a* and 1110*b* (one or more of which may be generally referred to as network nodes 1110), or any other similar 3rd Generation Partnership Project (3GPP) access node or non-3GPP access point. The network nodes 1110 facilitate direct or indirect connection of user equipment (UE), such as by connecting UEs 1112*a*, 1112*b*, 1112*c*, and 1112*d* (one or more of which may be generally referred to as UEs 1112) to the core network 1106 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1100 may include any number of wired or wireless networks, network nodes, UEs, and/or any other components or systems that may facilitate or participate in the communication of data and/or signals whether via wired or wireless connections. The communication system 1100 may include and/or interface with any type of communication, telecommunication, data, cellular, radio network, and/or other similar type of system.

The UEs 1112 may be any of a wide variety of communication devices, including wireless devices arranged, configured, and/or operable to communicate wirelessly with the network nodes 1110 and other communication devices. Similarly, the network nodes 1110 are arranged, capable, configured, and/or operable to communicate directly or indirectly with the UEs 1112 and/or with other network nodes or equipment in the telecommunication network 1102 to enable and/or provide network access, such as wireless network access, and/or to perform other functions, such as administration in the telecommunication network 1102.

In the depicted example, the core network 1106 connects the network nodes 1110 to one or more hosts, such as host 1116. These connections may be direct or indirect via one or more intermediary networks or devices. In other examples, network nodes may be directly coupled to hosts. The core network 1106 includes one more core network nodes (e.g., core network node 1108) that are structured with hardware and software components. Features of these components may be substantially similar to those described with respect to the UEs, network nodes, and/or hosts, such that the descriptions thereof are generally applicable to the corresponding components of the core network node 1108. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 1116 may be under the ownership or control of a service provider other than an operator or provider of the access network 1104 and/or the telecommunication network 1102, and may be operated by the service provider or on behalf of the service provider. The host 1116 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 1100 of FIG. 11 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 1102 is a cellular network that implements 3GPP standardized features. Accordingly, the telecommunications network 1102 may support network slicing to provide different logical networks to different devices that are connected to the telecommunication network 1102. For example, the telecommunications network 1102 may provide Ultra Reliable Low Latency Communication (URLLC) services to some UEs, while providing Enhanced Mobile Broadband (Embb) services to other UEs, and/or Massive Machine Type Communication (Mmtc)/Massive IoT services to yet further UEs.

In some examples, the UEs 1112 are configured to transmit and/or receive information without direct human interaction. For instance, a UE may be designed to transmit information to the access network 1104 on a predetermined schedule, when triggered by an internal or external event, or in response to requests from the access network 1104. Additionally, a UE may be configured for operating in single- or multi-RAT or multi-standard mode. For example, a UE may operate with any one or combination of Wi-Fi, NR (New Radio) and LTE, i.e., being configured for multi-radio dual connectivity (MR-DC), such as E-UTRAN (Evolved-UMTS Terrestrial Radio Access Network) New Radio-Dual Connectivity (EN-DC).

In the example, the hub 1114 communicates with the access network 1104 to facilitate indirect communication between one or more UEs (e.g., UE 1112*c* and/or 1112*d*) and network nodes (e.g., network node 1110*b*). In some examples, the hub 1114 may be a controller, router, content source and analytics, or any of the other communication devices described herein regarding UEs. For example, the hub 1114 may be a broadband router enabling access to the core network 1106 for the UEs. As another example, the hub 1114 may be a controller that sends commands or instructions to one or more actuators in the UEs. Commands or instructions may be received from the UEs, network nodes 1110, or by executable code, script, process, or other instructions in the hub 1114. As another example, the hub 1114 may be a data collector that acts as temporary storage for UE data and, in some embodiments, may perform analysis or other processing of the data. As another example, the hub 1114 may be a content source. For example, for a UE that is a VR headset, display, loudspeaker or other media delivery device, the hub 1114 may retrieve VR assets, video, audio, or other media or data related to sensory information via a network node, which the hub 1114 then provides to the UE either directly, after performing local processing, and/or after adding additional local content. In still another example, the hub 1114 acts as a proxy server or orchestrator for the UEs, in particular in if one or more of the UEs are low energy IoT devices.

The hub 1114 may have a constant/persistent or intermittent connection to the network node 1110*b*. The hub 1114 may also allow for a different communication scheme and/or schedule between the hub 1114 and UEs (e.g., UE 1112*c* and/or 1112*d*), and between the hub 1114 and the core network 1106. In other examples, the hub 1114 is connected to the core network 1106 and/or one or more UEs via a wired connection. Moreover, the hub 1114 may be configured to connect to an M2M service provider over the access network 1104 and/or to another UE over a direct connection. In some scenarios, UEs may establish a wireless connection with the network nodes 1110 while still connected via the hub 1114 via a wired or wireless connection. In some embodiments, the hub 1114 may be a dedicated hub—that is, a hub whose primary function is to route communications to/from the UEs from/to the network node 1110*b*. In other embodiments, the hub 1114 may be a non-dedicated hub—that is, a device which is capable of operating to route communications between the UEs and network node 1110*b*, but which is additionally capable of operating as a communication start and/or end point for certain data channels.

Figure 12:
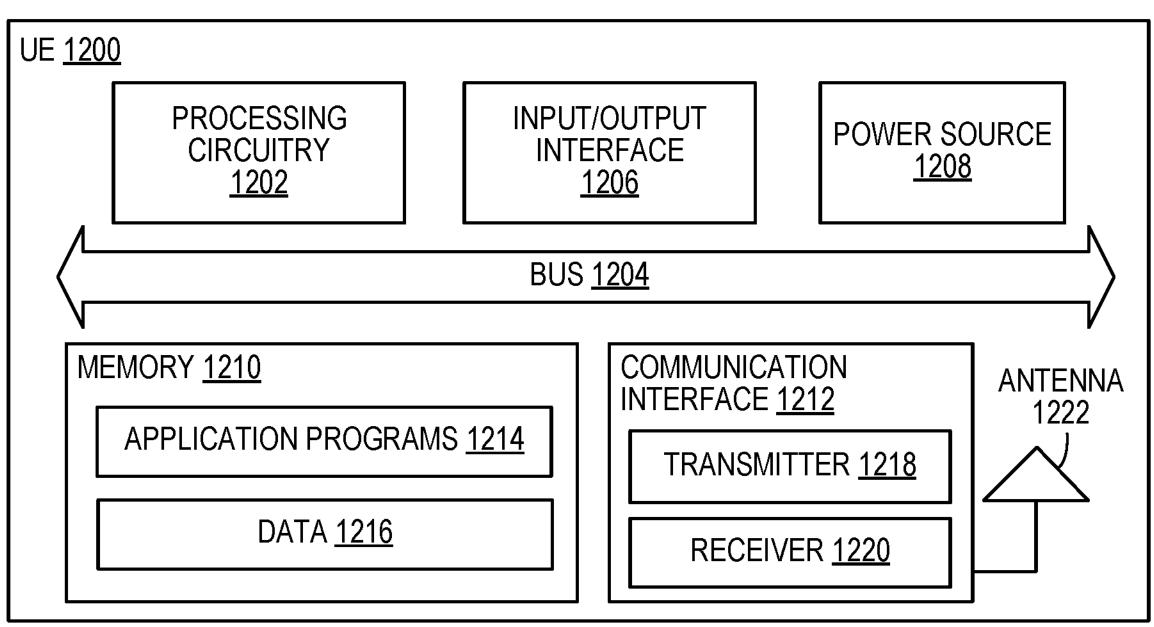
FIG. 12 shows a UE in accordance with some embodiments.

FIG. 12 shows a UE 1200 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VoIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3$^{rd}$ Generation Partnership Project (3GPP), including a narrow band internet of things (NB-IoT) UE, a machine type communication (MTC) UE, and/or an enhanced MTC (Emtc) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1200 includes processing circuitry 1202 that is operatively coupled via a bus 1204 to an input/output interface 1206, a power source 1208, a memory 1210, a communication interface 1212, and/or any other component, or any combination thereof. Certain UEs may utilize all or a subset of the components shown in FIG. 12. The level of integration between the components may vary from one UE to another UE. Further, certain UEs may contain multiple instances of a component, such as multiple processors, memories, transceivers, transmitters, receivers, etc.

The processing circuitry 1202 is configured to process instructions and data and may be configured to implement any sequential state machine operative to execute instructions stored as machine-readable computer programs in the memory 1210. The processing circuitry 1202 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 1202 may include multiple central processing units (CPUs).

In the example, the input/output interface 1206 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1200. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 1208 is structured as a battery or battery pack. Other types of power sources, such as an external power source (e.g., an electricity outlet), photovoltaic device, or power cell, may be used. The power source 1208 may further include power circuitry for delivering power from the power source 1208 itself, and/or an external power source, to the various parts of the UE 1200 via input circuitry or an interface such as an electrical power cable. Delivering power may be, for example, for charging of the power source 1208. Power circuitry may perform any formatting, converting, or other modification to the power from the power source 1208 to make the power suitable for the respective components of the UE 1200 to which power is supplied.

The memory 1210 may be or be configured to include memory such as random-access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 1210 includes one or more application programs 1214, such as an operating system, web browser application, a widget, gadget engine, or other application, and corresponding data 1216. The memory 1210 may store, for use by the UE 1200, any of a variety of various operating systems or combinations of operating systems.

The memory 1210 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (Euicc), integrated UICC (Iuicc) or a removable UICC commonly known as 'SIM card.' The memory 1210 may allow the UE 1200 to access instructions, application programs and the like, stored on transitory or non-transitory memory media, to off-load data, or to upload data. An article of manufacture, such as one utilizing a communication system may be tangibly embodied as or in the memory 1210, which may be or comprise a device-readable storage medium.

The processing circuitry 1202 may be configured to communicate with an access network or other network using the communication interface 1212. The communication interface 1212 may comprise one or more communication subsystems and may include or be communicatively coupled to an antenna 1222. The communication interface 1212 may include one or more transceivers used to communicate, such as by communicating with one or more remote transceivers of another device capable of wireless communication (e.g., another UE or a network node in an access network). Each transceiver may include a transmitter 1218 and/or a receiver 1220 appropriate to provide network communications (e.g., optical, electrical, frequency allocations, and so forth). Moreover, the transmitter 1218 and receiver 1220 may be coupled to one or more antennas (e.g., antenna 1222) and may share circuit components, software or firmware, or alternatively be implemented separately.

In the illustrated embodiment, communication functions of the communication interface 1212 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 1212, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected, an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 1200 shown in FIG. 12.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g., by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 13:
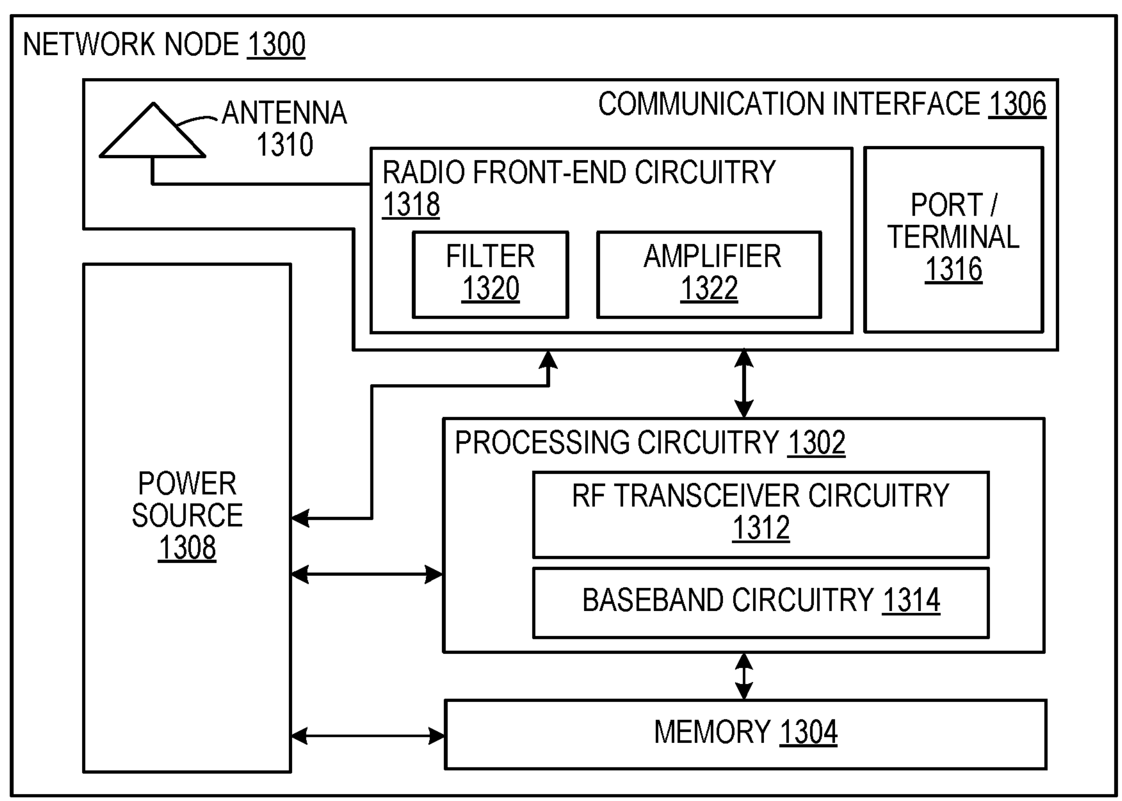
FIG. 13 shows a network node in accordance with some embodiments.

FIG. 13 shows a network node 1300 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (Aps) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1300 includes a processing circuitry 1302, a memory 1304, a communication interface 1306, and a power source 1308. The network node 1300 may be composed of multiple physically separate components (e.g., a NodeB component and a RNC component, or a BTS component and a BSC component, etc.), which may each have their own respective components. In certain scenarios in which the network node 1300 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1300 may be configured to support multiple radio access technologies (RATs). In such embodiments, some components may be duplicated (e.g., separate memory 1304 for different RATs) and some components may be reused (e.g., a same antenna 1310 may be shared by different RATs). The network node 1300 may also include multiple sets of the various illustrated components for different wireless technologies integrated into network node 1300, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1300.

The processing circuitry 1302 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1300 components, such as the memory 1304, to provide network node 1300 functionality.

In some embodiments, the processing circuitry 1302 includes a system on a chip (SOC). In some embodiments, the processing circuitry 1302 includes one or more of radio frequency (RF) transceiver circuitry 1312 and baseband processing circuitry 1314. In some embodiments, the radio frequency (RF) transceiver circuitry 1312 and the baseband processing circuitry 1314 may be on separate chips (or sets of chips), boards, or units, such as radio units and digital units. In alternative embodiments, part or all of RF transceiver circuitry 1312 and baseband processing circuitry 1314 may be on the same chip or set of chips, boards, or units.

The memory 1304 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1302. The memory 1304 may store any suitable instructions, data, or information, including a computer program, software, an application including one or more of logic, rules, code, tables, and/or other instructions capable of being executed by the processing circuitry 1302 and utilized by the network node 1300. The memory 1304 may be used to store any calculations made by the processing circuitry 1302 and/or any data received via the communication interface 1306. In some embodiments, the processing circuitry 1302 and memory 1304 is integrated.

The communication interface 1306 is used in wired or wireless communication of signaling and/or data between a network node, access network, and/or UE. As illustrated, the communication interface 1306 comprises port(s)/terminal(s) 1316 to send and receive data, for example to and from a network over a wired connection. The communication interface 1306 also includes radio front-end circuitry 1318 that may be coupled to, or in certain embodiments a part of, the antenna 1310. Radio front-end circuitry 1318 comprises filters 1320 and amplifiers 1322. The radio front-end circuitry 1318 may be connected to an antenna 1310 and processing circuitry 1302. The radio front-end circuitry may be configured to condition signals communicated between antenna 1310 and processing circuitry 1302. The radio front-end circuitry 1318 may receive digital data that is to be sent out to other network nodes or UEs via a wireless connection. The radio front-end circuitry 1318 may convert the digital data into a radio signal having the appropriate channel and bandwidth parameters using a combination of filters 1320 and/or amplifiers 1322. The radio signal may then be transmitted via the antenna 1310. Similarly, when receiving data, the antenna 1310 may collect radio signals which are then converted into digital data by the radio front-end circuitry 1318. The digital data may be passed to the processing circuitry 1302. In other embodiments, the communication interface may comprise different components and/or different combinations of components.

In certain alternative embodiments, the network node 1300 does not include separate radio front-end circuitry 1318, instead, the processing circuitry 1302 includes radio front-end circuitry and is connected to the antenna 1310. Similarly, in some embodiments, all or some of the RF transceiver circuitry 1312 is part of the communication interface 1306. In still other embodiments, the communication interface 1306 includes one or more ports or terminals 1316, the radio front-end circuitry 1318, and the RF transceiver circuitry 1312, as part of a radio unit (not shown), and the communication interface 1306 communicates with the baseband processing circuitry 1314, which is part of a digital unit (not shown).

The antenna 1310 may include one or more antennas, or antenna arrays, configured to send and/or receive wireless signals. The antenna 1310 may be coupled to the radio front-end circuitry 1318 and may be any type of antenna capable of transmitting and receiving data and/or signals wirelessly. In certain embodiments, the antenna 1310 is separate from the network node 1300 and connectable to the network node 1300 through an interface or port.

The antenna 1310, communication interface 1306, and/or the processing circuitry 1302 may be configured to perform any receiving operations and/or certain obtaining operations described herein as being performed by the network node. Any information, data and/or signals may be received from a UE, another network node and/or any other network equipment. Similarly, the antenna 1310, the communication interface 1306, and/or the processing circuitry 1302 may be configured to perform any transmitting operations described herein as being performed by the network node. Any information, data and/or signals may be transmitted to a UE, another network node and/or any other network equipment.

The power source 1308 provides power to the various components of network node 1300 in a form suitable for the respective components (e.g., at a voltage and current level needed for each respective component). The power source 1308 may further comprise, or be coupled to, power management circuitry to supply the components of the network node 1300 with power for performing the functionality described herein. For example, the network node 1300 may be connectable to an external power source (e.g., the power grid, an electricity outlet) via an input circuitry or interface such as an electrical cable, whereby the external power source supplies power to power circuitry of the power source 1308. As a further example, the power source 1308 may comprise a source of power in the form of a battery or battery pack which is connected to, or integrated in, power circuitry. The battery may provide backup power should the external power source fail.

Embodiments of the network node 1300 may include additional components beyond those shown in FIG. 13 for providing certain aspects of the network node's functionality, including any of the functionality described herein and/or any functionality necessary to support the subject matter described herein. For example, the network node 1300 may include user interface equipment to allow input of information into the network node 1300 and to allow output of information from the network node 1300. This may allow a user to perform diagnostic, maintenance, repair, and other administrative functions for the network node 1300.

Figure 14:
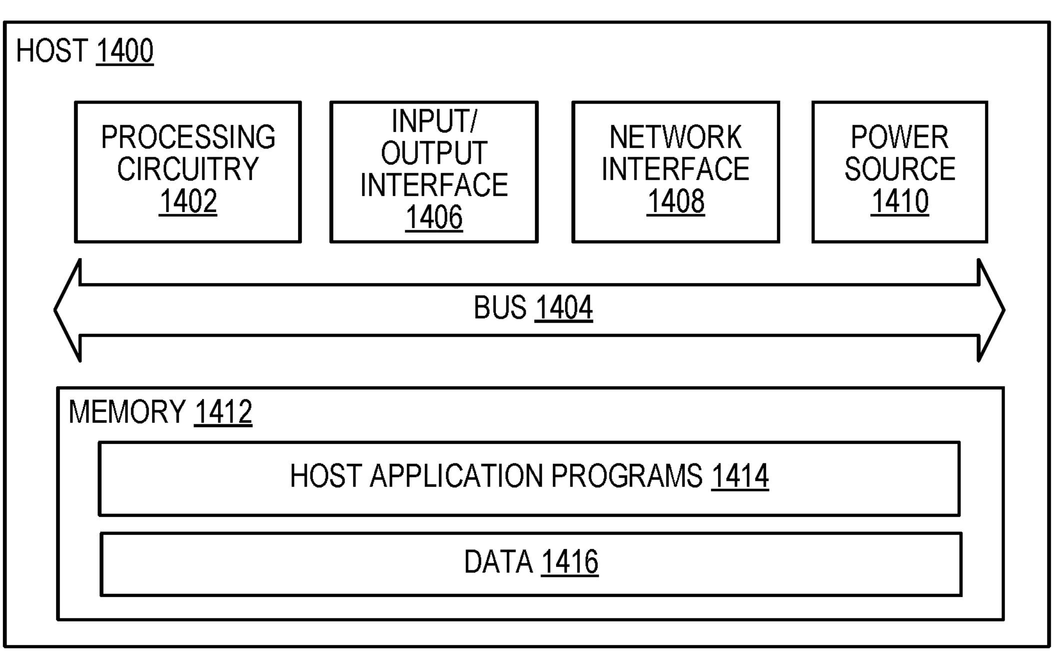
FIG. 14 is a block diagram of a host, which may be an embodiment of the host of FIG. 11, in accordance with various aspects described herein.

FIG. 14 is a block diagram of a host 1400, which may be an embodiment of the host 1116 of FIG. 11, in accordance with various aspects described herein. As used herein, the host 1400 may be or comprise various combinations hardware and/or software, including a standalone server, a blade server, a cloud-implemented server, a distributed server, a virtual machine, container, or processing resources in a server farm. The host 1400 may provide one or more services to one or more UEs.

The host 1400 includes processing circuitry 1402 that is operatively coupled via a bus 1404 to an input/output interface 1406, a network interface 1408, a power source 1410, and a memory 1412. Other components may be included in other embodiments. Features of these components may be substantially similar to those described with respect to the devices of previous figures, such as FIGS. 12 and 13, such that the descriptions thereof are generally applicable to the corresponding components of host 1400.

The memory 1412 may include one or more computer programs including one or more host application programs 1414 and data 1416, which may include user data, e.g., data generated by a UE for the host 1400 or data generated by the host 1400 for a UE. Embodiments of the host 1400 may utilize only a subset or all of the components shown. The host application programs 1414 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1414 may also provide for user authentication and licensing checks and may periodically report health, routes, and content availability to a central node, such as a device in or on the edge of a core network. Accordingly, the host 1400 may select and/or indicate a different host for over-the-top services for a UE. The host application programs 1414 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 15:
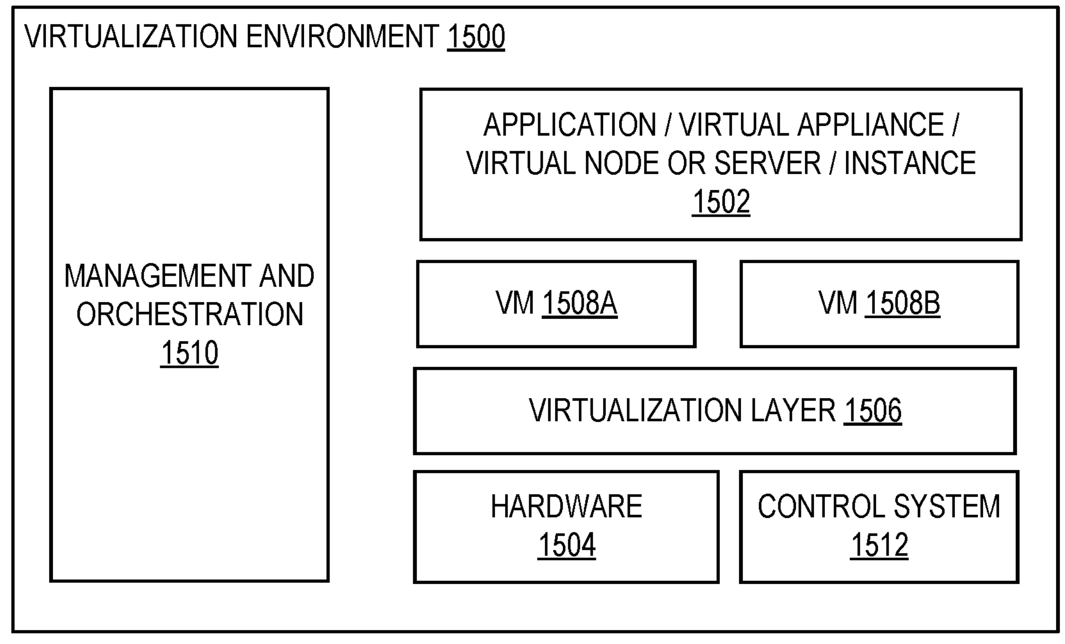
FIG. 15 is a block diagram illustrating a virtualization environment in which functions implemented by some embodiments may be virtualized.

FIG. 15 is a block diagram illustrating a virtualization environment 1500 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1500 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1502 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 1504 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 1506 (also referred to as hypervisors or virtual machine monitors (VMMs)), provide VMs 1508*a* and 1508*b* (one or more of which may be generally referred to as VMs 1508), and/or perform any of the functions, features and/or benefits described in relation with some embodiments described herein. The virtualization layer 1506 may present a virtual operating platform that appears like networking hardware to the VMs 1508.

The VMs 1508 comprise virtual processing, virtual memory, virtual networking or interface and virtual storage, and may be run by a corresponding virtualization layer 1506. Different embodiments of the instance of a virtual appliance 1502 may be implemented on one or more of VMs 1508, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1508 may be a software implementation of a physical machine that runs programs as if they were executing on a physical, non-virtualized machine. Each of the VMs 1508, and that part of hardware 1504 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1508 on top of the hardware 1504 and corresponds to the application 1502.

Hardware 1504 may be implemented in a standalone network node with generic or specific components. Hardware 1504 may implement some functions via virtualization. Alternatively, hardware 1504 may be part of a larger cluster of hardware (e.g., such as in a data center or CPE) where many hardware nodes work together and are managed via management and orchestration 1510, which, among others, oversees lifecycle management of applications 1502. In some embodiments, hardware 1504 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1512 which may alternatively be used for communication between hardware nodes and radio units.

Figure 16:
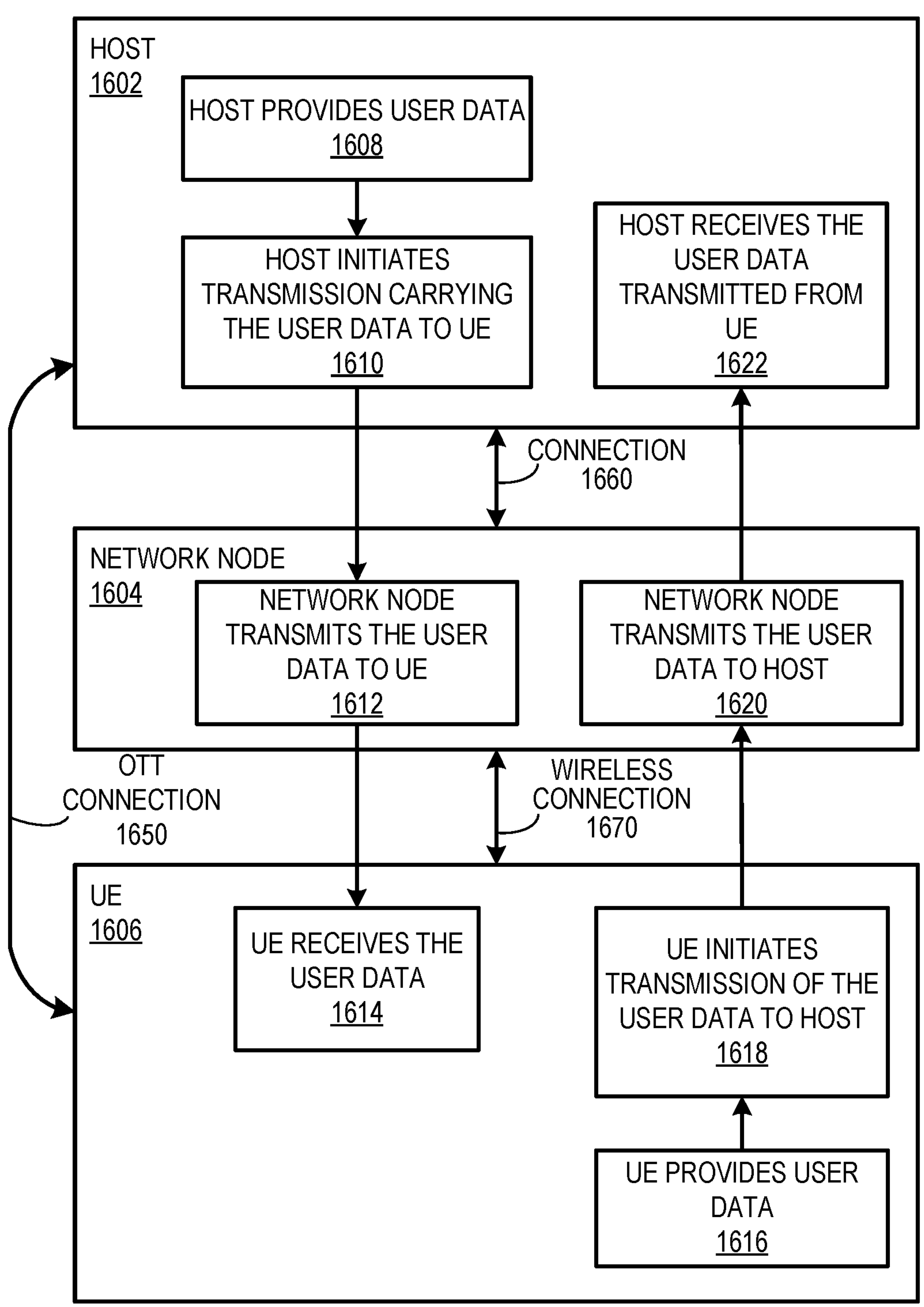
FIG. 16 shows a communication diagram of a host communicating via a network node with a UE over a partially wireless connection in accordance with some embodiments

FIG. 16 shows a communication diagram of a host 1602 communicating via a network node 1604 with a UE 1606 over a partially wireless connection in accordance with some embodiments. Example implementations, in accordance with various embodiments, of the UE (such as a UE 1112*a* of FIG. 11 and/or UE 1200 of FIG. 12), network node (such as network node 1110*a* of FIG. 11 and/or network node 1300 of FIG. 13), and host (such as host 1116 of FIG. 11 and/or host 1400 of FIG. 14) discussed in the preceding paragraphs will now be described with reference to FIG. 16.

Like host 1400, embodiments of host 1602 include hardware, such as a communication interface, processing circuitry, and memory. The host 1602 also includes software, which is stored in or accessible by the host 1602 and executable by the processing circuitry. The software includes a host application that may be operable to provide a service to a remote user, such as the UE 1606 connecting via an over-the-top (OTT) connection 1650 extending between the UE 1606 and host 1602. In providing the service to the remote user, a host application may provide user data which is transmitted using the OTT connection 1650.

The network node 1604 includes hardware enabling it to communicate with the host 1602 and UE 1606. The connection 1660 may be direct or pass through a core network (like core network 1106 of FIG. 11) and/or one or more other intermediate networks, such as one or more public, private, or hosted networks. For example, an intermediate network may be a backbone network or the Internet.

The UE 1606 includes hardware and software, which is stored in or accessible by UE 1606 and executable by the UE's processing circuitry. The software includes a client application, such as a web browser or operator-specific "app" that may be operable to provide a service to a human or non-human user via UE 1606 with the support of the host 1602. In the host 1602, an executing host application may communicate with the executing client application via the OTT connection 1650 terminating at the UE 1606 and host 1602. In providing the service to the user, the UE's client application may receive request data from the host's host application and provide user data in response to the request data. The OTT connection 1650 may transfer both the request data and the user data. The UE's client application may interact with the user to generate the user data that it provides to the host application through the OTT connection 1650.

The OTT connection 1650 may extend via a connection 1660 between the host 1602 and the network node 1604 and via a wireless connection 1670 between the network node 1604 and the UE 1606 to provide the connection between the host 1602 and the UE 1606. The connection 1660 and wireless connection 1670, over which the OTT connection 1650 may be provided, have been drawn abstractly to illustrate the communication between the host 1602 and the UE 1606 via the network node 1604, without explicit reference to any intermediary devices and the precise routing of messages via these devices.

As an example of transmitting data via the OTT connection 1650, in step 1608, the host 1602 provides user data, which may be performed by executing a host application. In some embodiments, the user data is associated with a particular human user interacting with the UE 1606. In other embodiments, the user data is associated with a UE 1606 that shares data with the host 1602 without explicit human interaction. In step 1610, the host 1602 initiates a transmission carrying the user data towards the UE 1606. The host 1602 may initiate the transmission responsive to a request transmitted by the UE 1606. The request may be caused by human interaction with the UE 1606 or by operation of the client application executing on the UE 1606. The transmission may pass via the network node 1604, in accordance with the teachings of the embodiments described throughout this disclosure. Accordingly, in step 1612, the network node 1604 transmits to the UE 1606 the user data that was carried in the transmission that the host 1602 initiated, in accordance with the teachings of the embodiments described throughout this disclosure. In step 1614, the UE 1606 receives the user data carried in the transmission, which may be performed by a client application executed on the UE 1606 associated with the host application executed by the host 1602.

In some examples, the UE 1606 executes a client application which provides user data to the host 1602. The user data may be provided in reaction or response to the data received from the host 1602. Accordingly, in step 1616, the UE 1606 may provide user data, which may be performed by executing the client application. In providing the user data, the client application may further consider user input received from the user via an input/output interface of the UE 1606. Regardless of the specific manner in which the user data was provided, the UE 1606 initiates, in step 1618, transmission of the user data towards the host 1602 via the network node 1604. In step 1620, in accordance with the teachings of the embodiments described throughout this disclosure, the network node 1604 receives user data from the UE 1606 and initiates transmission of the received user data towards the host 1602. In step 1622, the host 1602 receives the user data carried in the transmission initiated by the UE 1606.

One or more of the various embodiments improve the performance of OTT services provided to the UE 1606 using the OTT connection 1650, in which the wireless connection 1670 forms the last segment. More precisely, the teachings of these embodiments may improve the power consumption and allow network flexibility and thereby provide benefits such as extended battery life and energy savings.

In an example scenario, factory status information may be collected and analyzed by the host 1602. As another example, the host 1602 may process audio and video data which may have been retrieved from a UE for use in creating maps. As another example, the host 1602 may collect and analyze real-time data to assist in controlling vehicle congestion (e.g., controlling traffic lights). As another example, the host 1602 may store surveillance video uploaded by a UE. As another example, the host 1602 may store or control access to media content such as video, audio, VR or AR which it can broadcast, multicast or unicast to UEs. As other examples, the host 1602 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1650 between the host 1602 and UE 1606, in response to variations in the measurement results. The measurement procedure and/or the network functionality for reconfiguring the OTT connection may be implemented in software and hardware of the host 1602 and/or UE 1606. In some embodiments, sensors (not shown) may be deployed in or in association with other devices through which the OTT connection 1650 passes; the sensors may participate in the measurement procedure by supplying values of the monitored quantities exemplified above, or supplying values of other physical quantities from which software may compute or estimate the monitored quantities. The reconfiguring of the OTT connection 1650 may include message format, retransmission settings, preferred routing etc.; the reconfiguring need not directly alter the operation of the network node 1604. Such procedures and functionalities may be known and practiced in the art. In certain embodiments, measurements may involve proprietary UE signaling that facilitates measurements of throughput, propagation times, latency and the like, by the host 1602. The measurements may be implemented in that software causes messages to be transmitted, in particular empty or 'dummy' messages, using the OTT connection 1650 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

EXEMPLARY EMBODIMENTS

Group A Embodiments

1. A method performed by a user equipment for multi-slot monitoring, the method comprising:

receiving a search space configuration from a network node;

determining a search space monitoring slot within an X-slot group based on a location of a first slot of type0 CSS monitoring occasions within a slot group;

determining which one or more slot indices to monitor the search space; and responsive to receiving an instruction from a network to change a type0 PDCCH monitoring location, determining a new value for the determined search space monitoring slot and determining which one or more slot indices to monitor according to the determined new value for the determined search space monitoring slot.

2. The method of embodiment 1, wherein the search space configuration includes:

a period in terms of X-slot groups;

an offset in terms of X-slot groups within the period;

a duration in terms of X-slot groups within the period; and a parameter that indicates which one or more symbols to monitor within a slot.

3. The method of embodiment 2, wherein determining which one or more slot indices to monitor the search space is defined by the equation:

$$(\text{period} * p + \text{offset} + y) * X + n_0 \text{ modulo } X$$

wherein y=0, 1, . . . , (duration−1); wherein p=0, 1, 2, . . . .

4. The method of any of embodiments 1-3, wherein the search space configuration further includes:

an additional offset in terms of X-slot groups within the period, and wherein determining which one or more slot indices to monitor the search space accounts for the additional offset.

5. A method performed by a user equipment for, the method comprising:

receiving a search space configuration from a network node that includes:

a period in terms of X-slot groups, an offset in terms of X-slot groups within the period, a duration in terms of X-slot groups within the period, and a parameter that indicates which one or more symbols to monitor within a slot;

determining a start of an X-slot group based on a location of a first slot of type0 CSS monitoring occasions;

determining which one or more slot indices to monitor the search space; and responsive to receiving an instruction from a network to change a type0 PDCCH monitoring location, determining which one or more slot indices to monitor for all search spaces according to a new first slot of a type0 CSS monitoring occasion.

6. The method of embodiment 5, wherein the search space configuration further includes:

an additional offset in terms of X-slot groups within the period, and wherein determining which one or more slot indices to monitor the search space accounts for the additional offset.

7. A method performed by a user equipment for multi-slot, the method comprising:

receiving a search space configuration from a network node that includes:

a first period in terms of slots, a first offset in terms of slots, a first duration in terms of slots, and a parameter that indicates which one or more symbols to monitor within a slot;

determining a second period, a second offset, and second duration, in terms of X-slot groups as a floor (period/X), floor (offset/X), and floor(duration/X) respectively;

determining a search space monitoring slot within an X-slot group based on a location of a first slot of type0 CSS monitoring occasions within a slot group;

determining which one or more slot indices to monitor the search space; and responsive to receiving an instruction from a network to change a type0 PDCCH monitoring location, determining a new value for the determined search space monitoring slot and determining which one or more slot indices to monitor according to the determined new value for the determined search space monitoring slot.

8. A method performed by a user equipment for multi-slot monitoring, the method comprising:

receiving a search space configuration from a network node that includes:

a first period in terms of slots, a first offset in terms of slots, a first duration in terms of slots, and a parameter that indicates which one or more symbols to monitor within a slot;

determining a second period, a second offset, and second duration, in terms of X-slot groups as a floor (period/X), floor (offset/X), and floor(duration/X) respectively;

determining a start of an X-slot group based on a location of a first slot of type0 CSS monitoring occasions;

determining which one or more slot indices to monitor the search space; and responsive to receiving an instruction from a network to change a type0 PDCCH monitoring location, determining which one or more slot indices to monitor for all search spaces according to a new first slot of a type0 CSS monitoring occasion.

9. The method of any of the previous embodiments, further comprising:

providing user data; and forwarding the user data to a host via the transmission to the network node.

Group B Embodiments

10. A user equipment for multi-slot monitoring, comprising:

processing circuitry configured to perform any of the steps of any of the Group A embodiments; and power supply circuitry configured to supply power to the processing circuitry.

11. A user equipment (UE) for multi-slot monitoring, the UE comprising:

an antenna configured to send and receive wireless signals;

radio front-end circuitry connected to the antenna and to processing circuitry, and configured to condition signals communicated between the antenna and the processing circuitry;

the processing circuitry being configured to perform any of the steps of any of the Group A embodiments;

an input interface connected to the processing circuitry and configured to allow input of information into the UE to be processed by the processing circuitry;

an output interface connected to the processing circuitry and configured to output information from the UE that has been processed by the processing circuitry; and a battery connected to the processing circuitry and configured to supply power to the UE.

12. A host configured to operate in a communication system to provide an over-the-top (OTT) service, the host comprising:

processing circuitry configured to provide user data; and a network interface configured to initiate transmission of the user data to a cellular network for transmission to a user equipment (UE), wherein the UE comprises a communication interface and processing circuitry, the communication interface and processing circuitry of the UE being configured to perform any of the steps of any of the Group A embodiments to receive the user data from the host.

13. The host of the previous embodiment, wherein the cellular network further includes a network node configured to communicate with the UE to transmit the user data to the UE from the host.

14. The host of the previous 2 embodiments, wherein:

the processing circuitry of the host is configured to execute a host application, thereby providing the user data; and the host application is configured to interact with a client application executing on the UE, the client application being associated with the host application.

15. A method implemented by a host operating in a communication system that further includes a network node and a user equipment (UE), the method comprising:

providing user data for the UE; and initiating a transmission carrying the user data to the UE via a cellular network comprising the network node, wherein the UE performs any of the operations of any of the Group A embodiments to receive the user data from the host.

16. The method of the previous embodiment, further comprising:

at the host, executing a host application associated with a client application executing on the UE to receive the user data from the UE.

17. The method of the previous embodiment, further comprising:

at the host, transmitting input data to the client application executing on the UE, the input data being provided by executing the host application, wherein the user data is provided by the client application in response to the input data from the host application.

18. A host configured to operate in a communication system to provide an over-the-top (OTT) service, the host comprising:

processing circuitry configured to provide user data; and a network interface configured to initiate transmission of the user data to a cellular network for transmission to a user equipment (UE), wherein the UE comprises a communication interface and processing circuitry, the communication interface and processing circuitry of the UE being configured to perform any of the steps of any of the Group A embodiments to transmit the user data to the host.

19. The host of the previous embodiment, wherein the cellular network further includes a network node configured to communicate with the UE to transmit the user data from the UE to the host.

20. The host of the previous 2 embodiments, wherein:

the processing circuitry of the host is configured to execute a host application, thereby providing the user data; and the host application is configured to interact with a client application executing on the UE, the client application being associated with the host application.

21. A method implemented by a host configured to operate in a communication system that further includes a network node and a user equipment (UE), the method comprising:

at the host, receiving user data transmitted to the host via the network node by the UE, wherein the UE performs any of the steps of any of the Group A embodiments to transmit the user data to the host.

22. The method of the previous embodiment, further comprising:

at the host, executing a host application associated with a client application executing on the UE to receive the user data from the UE.

23. The method of the previous embodiment, further comprising:

at the host, transmitting input data to the client application executing on the UE, the input data being provided by executing the host application, wherein the user data is provided by the client application in response to the input data from the host application.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

What is claimed is:

1. A method performed by a user equipment (UE) for multi-slot physical downlink control channel (PDCCH) monitoring, the method comprising:

receiving a search space configuration from a network node;

determining a search space monitoring slot within a first X-slot group of a fixed pattern of X-slot groups based on a location of a first slot of type0 Common Search Space (CSS) monitoring occasions;

determining which one or more slot indices to monitor;

determining which one or more symbols to monitor within the determined one or more slot indices; and monitoring the determined one or more symbols within the determined one or more slot indices for PDCCH.

2. The method of claim 1, wherein the fixed pattern of X-slot groups is common to all user equipments (UEs), and wherein a location of Y slot(s) within an X-slot group can be different for different UEs based on a preferred SS/PBCH block index determined by each UE.

3. The method of claim 2, further comprising:

determining a start of the fixed pattern of X-slot groups based on a location of a first slot of a frame or a subframe.

4. The method of claim 1, further comprising:

receiving an instruction from the network node to change a type0 PDCCH monitoring location;

determining a new value for the determined search space monitoring slot; and determining which one or more slot indices to monitor according to the determined new value for the determined search space monitoring slot.

5. The method of claim 1, further comprising:

autonomously determining a new type0 PDCCH monitoring location during a random access procedure (RACH) including determining a new value of $n_0$ based on a preferred SS/PBCH block detected by the UE that is associated with a random access occasion (RO) used by the UE during the RACH procedure.

6. The method of claim 1, wherein a location of Y slot(s) within an X-slot group is located at the beginning of that X-slot group, and wherein a location of the X-slot groups can be different for different UEs based on a preferred SS/PBCH block index determined by each UE.

7. The method of claim 1, further comprising:

determining a start of the fixed pattern of X-slot groups based on a location of a first slot of type0 CSS monitoring occasions.

8. The method of claim 6, further comprising:

receiving an instruction from the network node to change a type0 PDCCH monitoring location; and determining which one or more slot indices to monitor for all search spaces according to a new first slot of a type0 CSS monitoring occasion.

9. The method of claim 1, wherein the search space configuration includes:

a period in terms of X-slot groups;

an offset in terms of X-slot groups within the period;

a duration in terms of X-slot groups within the period; and a parameter that indicates which one or more symbols to monitor within a slot.

10. The method of claim 9, wherein determining which one or more slot indices to monitor is defined by the equation:

$$(\text{period} * p + \text{offset} + y) * X + n_0 \text{ modulo } X$$

wherein y=0, 1, . . . , (duration−1); wherein p=0, 1, 2, . . . .

11. The method of claim 1, further comprising:

wherein the search space configuration includes:

a first period in terms of slots, a first offset in terms of slots, a first duration in terms of slots, and a parameter that indicates which one or more symbols to monitor within a slot;

determining a reinterpreted search space configuration including determining a second period, a second offset, and second duration, in terms of X-slot groups as a floor (period/X), floor (offset/X), and floor (duration/X) respectively; and wherein determining the which one or more slot indices to monitor is based on the reinterpreted search space configuration.

12. The method of claim 11, wherein determining which one or more slot indices to monitor is defined by the equation:

$$(\text{second period} * p + \text{second offset} + y) * X + n_0 \text{ modulo } X$$

wherein y=0, 1, . . . , (second duration−1); wherein p=0, 1, 2, . . . .

13. The method of claim 9, wherein determining which one or more symbols to monitor within the determined one or more slot indices based on the received search space configuration includes applying the parameter that indicates which one or more symbols to monitor within a slot to each of the determined one or more slot indices.

14. The method of claim 9, wherein the search space configuration further includes:

an additional offset in terms of X-slot groups within the period, and wherein determining which one or more slot indices to monitor the search space accounts for the additional offset.

15. A user equipment configured for multi-slot physical downlink control channel (PDCCH) monitoring, comprising:

a communication interface; and processing circuitry in communication with the communication interface and configured to perform operations comprising:

receiving a search space configuration from a network node;

determining a search space monitoring slot within a first X-slot group of a fixed pattern of X-slot groups based on a location of a first slot of type0 Common Search Space (CSS) monitoring occasions;

determining which one or more slot indices to monitor;

determining which one or more symbols to monitor within the determined one or more slot indices; and monitoring the determined one or more symbols within the determined one or more slot indices for PDCCH.

16. The user equipment of claim 15, wherein the operations further comprise:

determining a start of the fixed pattern of X-slot groups based on a location of a first slot of a frame or a subframe.

17. The user equipment of claim 15, wherein the operations further comprise:

receiving an instruction from the network node to change a type0 PDCCH monitoring location;

determining a new value for the determined search space monitoring slot; and determining which one or more slot indices to monitor according to the determined new value for the determined search space monitoring slot.

18. The user equipment of claim 15, wherein the operations further comprise:

autonomously determining a new type0 PDCCH monitoring location during a random access procedure (RACH) including determining a new value of no based on a preferred SS/PBCH block detected by the UE that is associated with a random access occasion (RO) used by the UE during the RACH procedure.

19. The user equipment of claim 15, wherein a location of Y slot(s) within an X-slot group is located at the beginning of that X-slot group, and wherein a location of the X-slot groups can be different for different UEs based on a preferred SS/PBCH block index determined by each UE.

20. The user equipment of claim 15, wherein the operations further comprise:

determining a start of the fixed pattern of X-slot groups based on a location of a first slot of type0 CSS monitoring occasions.

* * * * *